(12) United States Patent
Wang

(10) Patent No.: US 12,405,788 B2
(45) Date of Patent: Sep. 2, 2025

(54) VECTOR SHUFFLING METHOD, PROCESSOR AND ELECTRONIC DEVICE

(71) Applicant: LOONGSON TECHNOLOGY CORPORATION LIMITED, Beijing (CN)

(72) Inventor: Wenxiang Wang, Beijing (CN)

(73) Assignee: LOONGSON TECHNOLOGY CORPORATION LIMITED, Beijing (CN)

( * ) Notice: Subject to any disclaimer, the term of this patent is extended or adjusted under 35 U.S.C. 154(b) by 0 days.

(21) Appl. No.: 18/717,956

(22) PCT Filed: Dec. 8, 2022

(86) PCT No.: PCT/CN2022/137500
§ 371 (c)(1),
(2) Date: Jun. 7, 2024

(87) PCT Pub. No.: WO2023/104143
PCT Pub. Date: Jun. 15, 2023

(65) Prior Publication Data
US 2025/0045050 A1  Feb. 6, 2025

(30) Foreign Application Priority Data
Dec. 10, 2021 (CN) .......................... 202111508098.8

(51) Int. Cl.
G06F 9/30 (2018.01)
(52) U.S. Cl.
CPC ........ G06F 9/30036 (2013.01); G06F 9/3016 (2013.01)
(58) Field of Classification Search
CPC ............. G06F 9/30003; G06F 9/30007; G06F 9/30032; G06F 9/30036; G06F 9/30038; G06F 9/30109; G06F 9/3016
See application file for complete search history.

(56) References Cited

U.S. PATENT DOCUMENTS 11,900,111 B2 *  2/2024  Sudarsanan ......... G06F 9/30032
2004/0054877 A1  3/2004  Macy et al.
(Continued)

FOREIGN PATENT DOCUMENTS

CN       104335166 A       2/2015
CN       107741861 A       2/2018
(Continued)

OTHER PUBLICATIONS

Notice of Allowance for Patent Registration from Korean Intellectual Property Office dated Jul. 22, 2024 for Application No. 10-2024-7022968.
(Continued)

Primary Examiner — Andrew Caldwell
Assistant Examiner — Kasim Alli

(57) ABSTRACT

The present application provides a vector shuffling method, including: receiving an instruction, including: a register identifier and a shuffling parameter; the register identifier includes a source register identifier and a destination register identifier; the source register identifier is used to characterize a source register, which is a register storing a source element that is operated when a vector shuffling operation is performed; the destination register identifier is used to characterize a destination register, which is the register storing a target element that obtained after the vector shuffling operation is performed; and the shuffling parameter is used to indicate a parameter according to which the vector shuffling operation is performed on the source element; executing the instruction to perform the vector shuffling operation on the source element according to the shuffling parameter, and obtaining the target element after performing the vector shuffling operation; writing the target element into the destination register.

20 Claims, 5 Drawing Sheets

(56) References Cited

U.S. PATENT DOCUMENTS

| | | | |
|---|---|---|---|
| 2006/0184765 A1* | 8/2006 | Krueger | G06F 7/76 |
| | | | 712/E9.034 |
| 2009/0100247 A1* | 4/2009 | Moyer | G06F 9/30145 |
| | | | 712/E9.024 |
| 2013/0275718 A1* | 10/2013 | Ueda | G06F 7/766 |
| | | | 712/204 |
| 2016/0188532 A1 | 6/2016 | Ould-Ahmed-Vall et al. | |
| 2017/0177356 A1 | 6/2017 | Ould-Ahmed-Vall et al. | |
| 2017/0177357 A1* | 6/2017 | Ould-Ahmed-Vall | |
| | | | G06F 12/0855 |
| 2017/0235516 A1 | 8/2017 | Ould-Ahmed-Vall et al. | |

FOREIGN PATENT DOCUMENTS

| | | | |
|---|---|---|---|
| CN | 113010212 A | | 6/2021 |
| CN | 114297138 A | | 4/2022 |
| CN | 114297138 B | | 12/2023 |
| JP | 2014182825 A | | 9/2014 |
| JP | 2017529601 A | | 10/2017 |
| KR | 20140088019 A | | 7/2014 |
| WO | WO2006/033056 A2 | | 3/2006 |
| WO | WO2009144681 A1 | | 12/2009 |
| WO | WO2013/056980 A1 | | 4/2013 |
| WO | WO2014/004050 A2 | | 1/2014 |
| WO | WO2023104143 A1 | | 6/2023 |

OTHER PUBLICATIONS

Notification of Grant of Patent Rights for Inventions dated Oct. 12, 2023 for Chinese Application No. 202111508098.8.

The First Examination Opinion from National Intellectual Property Administration, PRC dated May 11, 2023 for Application No. 202111508098.8.

International Search Report dated Feb. 20, 2023 for International Application No. PCT/CN2022/137500.

Notice of Reasons for Refusal dated Dec. 24, 2024 for Japanese Application No. 2024-534616.

Extended European Search Report dated Jan. 2, 2025 for Application No. 22903562.1.

Examination Search Report dated Mar. 28, 2025 for Canadian Application No. 3,240,618.

* cited by examiner

```
┌─────────────────────────────────────────────────────────────────────┐
│     Receiving an instruction, the instruction including register identifiers and a │
│   shuffling parameter; where the register identifiers include one or more source   │
│    register identifiers and a destination register identifier; the one or more     │
│   source register identifiers are used to characterize one or more source          │
│   registers, the one or more source registers store one or more source elements    │
│   that are required when a vector shuffling operation is performed; the            │
│   destination register identifier is used to characterize a destination register,  │
│   and the destination register stores one or more target elements obtained after   │
│   the vector shuffling operation is performed; and the shuffling parameter is      │
│   used to indicate a parameter according to which the vector shuffling operation   │
│                 is performed on the one or more source elements                    │
└─────────────────────────────────────────────────────────────────────┘ 101
                                     ↓
┌─────────────────────────────────────────────────────────────────────┐
│      Executing the instruction to determine, according to the shuffling parameter, │
│    position information of the one or more source elements required for the vector │
│   shuffling operation in the one or more source registers and the number of the one│
│        or more source elements required for the vector shuffling operation; where  │
│      the shuffling parameter includes one or more index values and an opcode; the  │
│      one or more index values are used to indicate position information of each    │
│     of the one or more source elements required for the vector shuffling operation │
│     in the one or more source registers; and the opcode is used to characterize    │
│     an operation performed on the one or more source registers and the destination │
│     register; when the number of the one or more index values is different from    │
│     the number of the one or more source elements, determining a grouping method   │
│     for the one or more source elements according to the number of the one or     │
│     more index values, and determining a selection rule according to the grouping  │
│     method and the opcode; obtaining one or more source elements indicated by each │
│     of the one or more index values respectively from the one or more source       │
│     registers according to the selection rule; determining one or more source      │
│     elements obtained according to the selection rule as the one or more target    │
│                                      elements                                      │
└─────────────────────────────────────────────────────────────────────┘ 102
                                     ↓
┌─────────────────────────────────────────────────────────────────────┐
│            Writing the one or more target elements into the destination register   │
└─────────────────────────────────────────────────────────────────────┘ 103
```

FIG. 1

VECTOR SHUFFLING METHOD, PROCESSOR AND ELECTRONIC DEVICE

CROSS-REFERENCE TO RELATED APPLICATIONS

This application is a national stage of International Application No. PCT/CN2022/137500, filed on Dec. 8, 2022, which claims priority to Chinese patent application No. 202111508098.8, filed to the China National Intellectual Property Administration on Dec. 10, 2021, and entitled "VECTOR SHUFFLING METHOD, PROCESSOR AND ELECTRONIC DEVICE". The disclosures of the aforementioned applications are incorporated herein by reference in their entireties.

TECHNICAL FIELD

The present application relates to the field of computer technology and, in particular, to a vector shuffling method, a processor and an electronic device.

BACKGROUND

With a development of multimedia applications, more and more computing tasks for a processor come from the field of digital image processing. An image-based application has become a nonnegligible workload in servers, desktop computers, and personal mobile devices (i.e., embedded devices). With respect to an actual situation of digital image processing software, updating an instruction set architecture and adding an instruction support for commonly used operations of the application in the processor is a major direction for developing the processor, and it is also a simple and effective method for the processor to improve performance with respect to specific applications. Therefore, a single instruction multiple data (SIMD) structure is added in more and more processors, so as to support same type of operations on a rule dataset.

At present, shuffle instructions are widely introduced in SIMD processors, and different shuffle instructions can meet different requirements. However, in existing technical solutions, when implementing a vector shuffling operation for specific functions, multiple instructions are required to implement a series of operations, an operation method of which is more complex, and execution efficiency of the specific function is reduced.

SUMMARY

The present application provides a vector shuffling method, a processor, and an electronic device, so as to solve an issue that multiple instructions are required to implement a series of operations in existing technology, an operation method is more complex, and execution efficiency of specific functions is reduced.

To address the above issue, the present application discloses a vector shuffling method, including:
  receiving an instruction, the instruction includes: a register identifier and a shuffling parameter; where, the register identifier includes a source register identifier and a destination register identifier; the source register identifier is used to characterize a source register, the source register is a register storing a source element that is operated when a vector shuffling operation is performed; the destination register identifier is used to characterize a destination register, and the destination register is the register storing a target element that obtained after the vector shuffling operation is performed; and the shuffling parameter is used to indicate a parameter according to which the vector shuffling operation is performed on the source element;
  executing the instruction to perform the vector shuffling operation on the source element obtained from the source register according to the shuffling parameter, and obtaining the target element after performing the vector shuffling operation;
  writing the target element into the destination register.

To address the above issue, the present application discloses a processor, including:
  multiple vector registers, where the multiple vector registers include a source register and a destination register, and the source register is configured to store a data element;
  a decoding unit, configured to decode a vector shuffling instruction; where, the vector shuffling instruction includes: a register identifier and a shuffling parameter, and the register identifier includes a source register identifier and a destination register identifier;
  an executing unit, configured to perform a vector shuffling operation on a source element obtained from the source register according to the shuffling parameter in response to the vector shuffle instruction, obtain a target element after performing the vector shuffling operation, and write the target element into the destination register.

To address the above issue, the present application discloses an electronic device, including a memory and one or more programs, where the one or more programs are stored in the memory, and configured to enable one or more processors to execute the vector shuffling method as described above.

Compared with existing technology, the present application includes the following advantages:
  the vector shuffling method, the processor, and the electronic device provided by embodiments of the present application can perform the vector shuffling operation on elements obtained from the source register in combination with the shuffling parameter by adding the register identifier and the shuffling parameter in the instruction. Therefore, the vector shuffling operation for specific functions be implemented through one instruction, without requiring multiple instructions used for performing the shuffling operation to implement the specific function, thereby improving execution efficiency of the specific function.

BRIEF DESCRIPTION OF DRAWINGS

FIG. 1 is a step flowchart of a vector shuffling method provided by Embodiment 1 of the present application;

DESCRIPTION OF EMBODIMENTS

Figure 2:
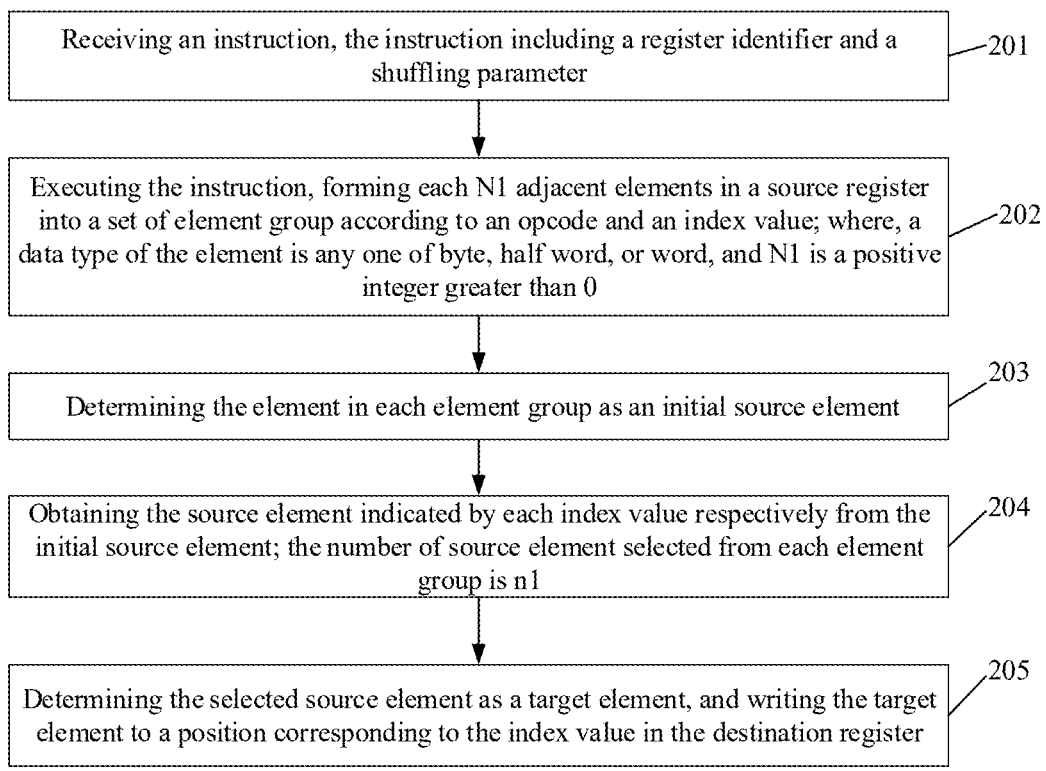
FIG. 2 is a step flowchart of a vector shuffling method provided by Embodiment 2 of the present application.

In order to make above purposes, features, and advantages of the present application more obvious and understandable, further detailed explanations of the present application will be provided below in combination with accompanying drawings and specific implementations.

Terms such as "first", "second", "third" and the like in the specification, claims, and the above accompanying drawings in the present application are used to distinguish similar or same types of objects or entities, and do not necessarily mean limiting a specific sequence or order, unless otherwise indicated (Unless otherwise indicated). It should be understood that, the terms used in this way can be interchanged in appropriate circumstances, such as being able to be implemented according to an order other than those shown or descripted in the embodiments of the present application.

Although the following embodiments are described with reference to a processor, other embodiments are applicable to other types of integrated circuits and logic devices. Above techniques and teachings of the present application can be more easily applied to other types of circuits or semiconductor devices, which will benefit from higher pipeline throughput and improved performance. The embodiments of the present application are applicable to any processor or machine that performs data manipulation. However, the present application is not limited to the processor or machine that perform 256-bit, 128-bit, 64-bit, 32-bit, or 16-bit data operations, but is applicable to any processor and machine in which combined data needs to be operated.

In the following description, for the purpose of explanation, a large number of specific details are provided to provide a thorough understanding of the present application. However, technical personnel in this field should recognize that these specific details are not necessary for implementing the present application. In other cases, some well-known electrical structures and circuits were not provided in detail to avoid unnecessary confusion with the present application. In addition, the following description provides multiple examples, and the accompanying drawings illustrate various examples for illustration. However, these examples should not be understood as restrictive, as they are only intended to provide some examples of the present application, rather than to provide an exhaustive list of all possible implementations of the present application.

Although the following examples describe instruction processing and distribution in context of executing units, other embodiments of the present application may be implemented in software form. In one embodiment, the method of the present application is manifested as machine executable instructions. The instructions can be used to enable general-purpose or specialized processors programmed with these instructions to perform steps of the present application. The steps of the present application may be performed by dedicated hardware components containing a hard-wired logic for executing the steps, or by any combination of programmed computer components and customized hardware components. These software can be stored in a memory within a system.

Embodiment 1

Referring to FIG. 1, which shows a step flowchart of a vector shuffling method provided by an embodiment of the present application.

An executive body of the vector shuffling method provided by the embodiment of the present application can be a central processing unit (CPU), including the following steps:

Step 101: receiving an instruction, the instruction including a register identifier and a shuffling parameter.

In the embodiment of the present application, the instruction refers to an instruction used to perform a vector shuffling operation, and the instruction is the instruction to be executed by the CPU.

When performing the vector shuffling operation, the instruction for performing the vector shuffling operation can be received by the CPU, and the instruction includes the register identifier and the shuffling parameter.

Where, the register identifier can include: a source register identifier and a destination register identifier, the source register identifier is used to characterize a source register, which is a register storing a source element that is operated when the vector shuffling operation is performed; the source element being operated during an execution of the shuffling operation can be all data stored in the source register, or a portion of the data stored in the source register. The destination register identifier is used to characterize a destination register, which is the register storing a target element obtained after the vector shuffling operation is performed.

In this example, the number of source registers can be one or two, that is, the source elements come from one or two registers. Specifically, the number of source registers can be determined according to business requirements, and the embodiment of the present application is not limited to this.

The shuffling parameter can be used to indicate parameters according to which the vector shuffling operation is performed on the source element. In this example, the shuffling parameter can include: an index value, an opcode, and other parameters; in an implementation, the index value is presented in a form of an immediate value; and the opcode is a code represented in a binary format, or the opcode is an identifier that can be converted into a binary code.

After the instruction is received, Step 102 will be executed.

Step 102: executing the instruction to perform the vector shuffling operation on the source element obtained from the source register according to the shuffling parameter, and obtaining the target element after performing the vector shuffling operation.

Where, the target element refers to the element obtained after performing the vector shuffling operation on the element in the source register.

In the embodiment of the present application, after the CPU receiving the instruction for performing the vector shuffling operation, the instruction can be executed by the CPU, so as to perform the vector shuffling operation on the source element obtained from the source register according to the shuffling parameter, and to obtain the target element after performing the vector shuffling operation.

Step 103: writing the target element into the destination register.

In the embodiment of the present application, after the target element after performing the vector shuffling operation is obtained, the target element can be written into the destination register.

In an implementation, the source elements is obtained according to the shuffling parameter to perform the vector shuffling operation, and a method for obtaining the target elements includes: selecting the source element from the source register according to position information of the source elements required for the vector shuffling operation in the source register and the number of source elements required for the vector shuffling operation, and taking all selected source elements as the target elements. Specifically, a detailed description can be provided in combination with the following specific implementation.

In the specific implementation of the present application, the above Step 102 may include:

Sub-step A1: determining the position information of the source element in the source register and the number of source elements required for the vector shuffling operation according to the shuffling parameter; where, the number of selected source element is one or multiple.

In the embodiment of the present application, the shuffling parameter includes parameters that can be used to indicate the position information of the source element in the source register and the number of source elements.

After the instruction for performing the vector shuffling operation has been received by the CPU, the instruction can be parsed to obtain the shuffling parameter included in the instruction.

After the shuffling parameter included in the instruction is obtained through parsing, the position information of the source elements required for the vector shuffling operation in the source register and the number of source elements required for the vector shuffling operation can be determined according to the shuffling parameter. Where, the number of selected source element can be one or multiple. In subsequent examples, multiple source elements will be used as examples for explanation.

After the position information of the source elements in the source register and the number of source elements are determined according to the shuffling parameter, Sub-step A2 will be executed.

Sub-step A2: selecting the source elements from the source register according to the determined position information and the number of source elements.

When determining the position information of source elements in the source register and the number of source elements according to the shuffling parameter, the source elements are selected from the source register.

After the source elements are selected from the source register according to the determined position information and the determined number of source elements, Sub-step A3 will be executed.

Sub-step A3: determining all selected source elements as the target elements.

After the source elements are selected from the source register according to the determined position information and the determined number of source elements, all selected source elements can be used as the target elements to be written into the destination register.

In the embodiment of the present application, the shuffling parameter may include an index value and an opcode, and the source elements are selected by means of the index value and opcode. Specifically, a detail description will be provided in combination with the following specific implementation.

In an implementation, the index value is used to indicate the position information of each source element required for the vector shuffling operation in the source register; the opcode is used to characterize an operation performed on the source register and destination register, and the above sub-step A2 can include:

Sub-step B1: determining a selection rule for obtaining the source elements according to the index value and the opcode.

In the embodiment of the present application, the selection rule refers to a constraint condition for reading the source elements from the source register.

After the shuffling parameter is obtained, the selection rule for obtaining the source elements from the source register can be determined according to the index value and the opcode included in the shuffling parameter. Specifically, it can be divided into the following two cases:

in a first case, when the number of index values is different from the number of source elements, a grouping method for the source elements can be determined according to the number of index values, and the selection rule for obtaining the source elements can be determined according to the grouping method and the opcode. That is, the source elements of the source register are first grouped; for example, taking N adjacent source elements as one group, and then the selection rule for the source elements is obtained from grouping elements according to the index values. Normally, N is four; and certainly, N can also be determined according to specific application scenarios such as the number of bits of the source register, which will not be elaborated here.

In a second case, when the number of index values is the same as the number of source elements, the selection rule for obtaining the source elements can be determined according to the opcode.

After the selection rule for obtaining the source elements is determined according to the index values and the opcode, Sub-step B2 will be executed.

Sub-step B2: obtaining the source elements indicated by each index value respectively from the source register according to the selection rule.

After the selection rule for obtaining the source elements are determined according to the index value and the opcode, the source elements indicated by each index value can be obtained respectively from the source register according to the selection rule.

In practical applications, the CPU can determine whether the number of index values is the same as the number of source elements by means of the opcode of the vector shuffling instruction. That is, the CPU can determine a grouping situation and the selection rule for the source elements according to the opcode.

In an implementation, there is a preset correspondence between the index value and address in the destination register. In an implementation, the target elements are written to positions corresponding to the immediate values in the destination register, that is, the positions corresponding to the index values are determined from the destination register, and the source elements are stored sequentially at the determined positions. Specifically, any one source element is obtained through a determined index value, and this source element is written to the address in the destination register that has the correspondence with the determined index value. For example, a source element A is obtained by means of the index value ui8 [1:0] (where ui8 represents the immediate value, which is the index value representing a set of data, and ui8 [1:0] represents a number composed of the lowest 2 bits of the immediate value), the index value ui8 [1:0] corresponds to the lowest address in a set of addresses in the destination register, and then the obtained source element A is written as one target element to the lowest address in the destination register. As an example, the immediate value ui8 is the set of data consisting of 8 bits, 4 index values are constructed using the immediate value ui8, and the number formed by each 2 bits of ui8 is used as one index value. And positions or sequence numbers of these index values in ui8 indicate or imply element positions where the source elements obtained according to the index value should be moved to in the destination register. For example, when the index value ui8 [7:6] is the fourth index value in ui8, its corresponding source element will be written to the fourth element position in the destination register. Similarly, when ui8 [n: n−1] is the $(n+1)/2^{th}$ index value in ui8, its corresponding source element will be written to the $(n+1)/2^{th}$ element position in the destination register. It can be understood that, the immediate value can include other numbers of index values, and accordingly, the source element corresponding to the i-th index value in the immediate value will be written to the i-th element position in the destination register, where i is a positive integer.

In existing technology, when implementing SHUF instruction (a type of shuffle instruction), one of such shuffle instruction can achieve shuffling effects with different functions according to setting of a shuffling mode; the shuffling mode is determined by application requirements, and can usually be called by at least one of other instruction and transmitted to the above shuffle instruction; alternatively, the shuffling mode can be added to a memory and obtained by accessing the memory during the execution of the above shuffle instruction. It can be seen that, in existing technologies, methods requiring multiple instructions or of accessing memories are required to implement the shuffle instruction with different shuffling modes; and whether it is multiple-instruction method or memory access method, they both greatly increases an overhead of entire CPU system when implementing the shuffle instructions. Based on technical issues existed in the existing technology, in the embodiment of the present application, by adding the shuffling parameter (opcode and index value) in the instructions, different shuffling parameters can achieve the shuffle instructions of different shuffling modes, thereby achieving a data shuffling operation through one single shuffle instruction and effectively reducing a system overhead without using multiple instructions to implement the data shuffling as well as obtaining the shuffling mode without through accessing the memory.

Due to a fact that the index values can be implemented by means of the immediate value, the opcode can be implemented through codes with a binary representation, or the opcode can be implemented through identifiers that can be converted into the binary code. Therefore, in combination with an implementation of the vector shuffling instructions including the opcode and index values in Embodiment 1, specific processing methods of the vector shuffling instruction including different opcodes are described in detail through the following specific Embodiments 2 to 6.

Embodiment 2

In a specific implementation of the present application, the opcode is a first opcode, and the number of index values is different from the number of source elements. As shown in FIG. 2, a processing method of a vector shuffle instruction can include:

Step 201: receiving an instruction, the instruction including a register identifier and a shuffling parameter.

In the embodiment of the present application, the meaning of the instruction and parameters included in the instruction are as described in Embodiment 1, which will not be elaborate here.

In an implementation, the number of source registers is one, that is, the source elements come from one register.

In an implementation, the shuffling parameter includes an index value and an opcode; where, the index value is implemented in a form of an immediate value; the opcode is implemented in the form of identifiers that can be converted into a binary code, and the opcode is the first opcode.

In an implementation, an instruction format is "opcode destination register, source register, immediate value". Based on the instruction format, in a specific implementation, the instruction can be represented as "[X] VS. {B/H/W} vd, vj, ui8"; [X] VS is an instruction name in the first opcode, [X] is an option, used to distinguish registers with different bits, {B/H/W} is a data type in the first opcode, B represents that the data type is byte, H represents that the data type is half word, W represents that the data type is word, [X] VS. {B/H/W} is the first opcode in a identifier form; vd represents the destination register, vj represents the source register, and ui8 represents the immediate value. Exemplarily, VS. {B/H/W} is the first opcode that can be converted to a binary form, for example, converting [X] VS.B to the first opcode with the binary form like 01110011100100. In addition, the immediate value can be a set of data, such as expressing index values for different positions in the register through different bits of the immediate value ui8, such as ui8 [1:0], ui8 [3:2], ui8 [5:4], and ui8 [7:6].

Step 202: executing the instruction, and forming each N1 adjacent elements in the source register into a set of element group according to the opcode and the index value; where, the data type of the element is any one of byte, half word, or word, and N1 is a positive integer greater than 0.

In the embodiment of the present application, when the number of index values is different from the number of source elements, each N1 adjacent elements in the source register can be formed as a set of element group, and the data type of the adjacent elements can be any one of byte, half word, or word. For example, every four adjacent word elements in the source register can be formed as a set of element group. Where, when the number of index values is different from the number of source elements, multiple conditions such like forming each N1 adjacent elements in the source register into a set of element group, where the data type of the adjacent elements can be any one of byte, half word, or word; selecting the source elements from the element group, N1 being a positive integer greater than 0, are determined as a selection rule. For example, N1 is also the number of index values, so even if the number of index values is less than the number of source elements, the source elements are grouped according to a difference between amounts of N1 and the number of the source elements, so that the number of index values is equal to the number of source elements within each group, thereby each index value corresponds one-to-one to the source elements within the group.

Where, the adjacent elements refer to the elements in the source register that are sequentially adjacent in position. The element addresses in multiple adjacent element groups are partially identical or completely different, and the element address is position information of the element in the register. When there are elements with the same position information among multiple adjacent element groups, the maximum number of elements with the same position information between every two adjacent element groups is N1−1. Furthermore, the adjacent elements are cross-adjacent elements in the source register. For example, when the opcode is the first opcode and the data type is byte, half word, or word, assuming that the source register includes eight elements, namely Element A1, Element A2, Element A3, Element A4, Element A5, Element A6, Element A7 and Element A8, the position information of the above elements is sequentially-adjacent in a shown order, N1-4; where, N1 elements can be sequentially-adjacent elements or cross-adjacent elements; for example, when N1 is four, assuming the source register includes eight elements, namely Element A1, Element A2, Element A3, Element A4, Element A5, Element A6, Element A7 and Element A8, the N1 elements can be Elements A2 to A5, or can be cross adjacent elements namely Element A1, Element A3, Element A5 and Element A7.

Based on the above embodiments, forming each N1 adjacent elements in the source register into a set of element group includes two cases:
  in a first case, forming Elements A1~A4 into the set of element group, and forming Elements A5~A8 into another set of element group, where there are no elements with the same position information between the two element groups;
  in a second case, forming Elements A1~A4 into the set of element group, and forming Elements A2~A5 into another set of element group, there are three elements with the same position information between the two groups (i.e., Elements A2, A3, and A4). In addition, Elements A3~A6 can also be selected to form another element group, or Elements A4~A7 can be selected to form another element group; as long as the maximum number of elements with the same position information between every two adjacent element groups is N1-1, which will not be elaborate here.

In an implementation, in the divided multiple element groups, the data types of the elements included in each element group are the same, and the data types of the elements included in different element groups are the same. For example, the divided element groups include: Element Group 1, Element Group 2, and Element Group 3; where, the data types of the elements included in Element Groups 1, 2, and 3 are all bytes; alternatively, the data types of the elements included in Element Groups 1, 2, and 3 are all half words; alternatively, the data types of the elements included in Element Groups 1, 2, and 3 are all words.

Furthermore, different element groups use the same index value, or different element groups use different index values. For example, when different element groups use the same index value, Element Groups 1 to 4 all use the same index value ui8; when different element groups use different index values, Element Groups 1 and 2 use ui8a as the index value to select the source elements, Element Groups 3 and 4 use ui8b as the index value to select the source elements, where ui8a and ui8b represent different positions in ui8, and both of them represent the index values with different values.

In another example, in multiple element groups, the data types of respective elements within the element group are the same, but the elements within different element groups (such as elements in Element Group 1 and Element Group 2) have different data types. Furthermore, the number of elements in each element group is the same or different. For example, there are 4 elements in Element Group 1, and there are 2 elements in Element Group 2, while the same immediate value ui8 provides 4 index values for Element Group 1, and 2 index values for Element Group 2.

It can be understood that, the above examples are only listed for a purpose of better understanding technical solutions of the embodiments of the present application, and are not taken as an only limitation on the embodiments of the present application.

After each N1 adjacent elements in the source register have been formed into a set of element group, Step 203 will be executed.

Step 203: determining the element in each element group as an initial source element.

In the embodiment of the present application, after each N1 adjacent elements in the source register are formed into a set element group, the elements in each element group can be determined as the initial source elements. And the initial source element refers to an initial element used to select the source element.

After the element of each element group has been determined as the initial source element, Step 204 will be executed.

Step 204: obtaining the source element indicated by each index value respectively from the initial source element; the number of source element selected from each element group is n1.

In the embodiment of the present application, after determining the initial source elements, the source element indicated by each immediate value can be obtained respectively from the initial source element; that is, corresponding source elements are selected from the element group according to the immediate values. The number of source elements selected from each element group is n1, which is a positive integer greater than 0.

In an implementation, there is a preset correspondence between the immediate values and element positions in each element group; the element position can be the element address or a sequence bit of the element in the element group, where the sequence bit represents a position number of the element in the element group.

In an implementation, obtaining the source element indicated by each immediate value respectively from the initial source elements means respectively obtaining the elements at the element positions corresponding to the immediate values from each element group, and determining the obtained element as the source element. Where, the number of source elements selected from different element groups is the same.

In a specific implementation, when the opcode is the first opcode, N1=4, and the data type is byte, half word, or word, each element group includes the same number of initial source elements, all of which are four, then the source elements corresponding to the immediate values are selected from each element group; n1 is 4, and N1=n1. For example, when the immediate value represents Element Address 3, the elements with the address being 3 are selected from each element group, and all selected elements are determined as the source elements; for another example, when the immediate value represents the sequence bit being 3, a third element moving backward from a first element is selected in each element group, and all selected elements are determined as the source elements.

In an implementation, N1 can be equal or unequal to n1; when N1=n1, Step 204 can be skipped, and the elements in each element group in Step 203 can be directly selected as the selected elements.

Furthermore, the number of source elements selected from each element group is four, and the data type of the source elements is byte, half word, or word; usually, the data type of each selected source element is the same.

Step 205: determining the selected source element as the target element, and writing the target element to a position corresponding to the index value in the destination register.

In the embodiment of the present application, there is the preset correspondence between the immediate value and the address in the destination register. In an implementation, writing the target element to the position corresponding to the immediate value in the destination register means determining the position corresponding to the immediate value from the destination register, and storing the source elements sequentially in the determined positions.

Furthermore, in a feasible solution, a step of creating an intermediate vector can be added between Steps 201 and 202. Specifically, before selecting the source element from the source register according to the determined position information and the number of source elements, the intermediate vector is created; the intermediate vector includes at least one intermediate vector parameter, and the number of intermediate vector parameters is equal to the number of target elements. Based on the created intermediate vector, after Step 204, i.e. after the source elements is selected from the source register, each of the selected source elements is respectively stored in the corresponding intermediate vector parameter in the intermediate vector; where, there is a one-to-one correspondence between the intermediate vector parameter and the selected source element; Step 205 means to write content of each intermediate vector parameter to the corresponding position of the destination register according to the immediate value.

In an implementation, the intermediate vector can be created according to the source register; where, the intermediate vector can be created according to the type of source register and the like.

In an implementation, the number of intermediate vector parameters in the intermediate vector is the same as the number of target elements, and based on the index value, there is the preset correspondence between the position of each target element in the destination register and each intermediate vector parameter in the intermediate vector, in the case where the source elements being grouped, based on the immediate value, the content of each intermediate vector parameter is written to the corresponding position of the destination register. That is, setting parameter i, where i represents a constant, a value range of i is 0~n−1, and n is determined by the number of register bits and the data type; determining the source element indexed by each intermediate vector parameter in the intermediate vector in the source register according to N1 and i; traversing values of i from 0 to n−1, and writing the source elements corresponding to different index values in the intermediate vector to positions of the target elements corresponding to indexes in the destination register. Specifically, [N1i], [N1i+1], [N1i+2], . . . , [N1i+N1−1] are used to represent different positions respectively, and the intermediate vector can be represented as "Intermediate Vector={VR [Source Register]. Data type [N1i+N1−1], . . . , VR [Source Register]. Data type [N1i]}"; where, i represents the constant, the value range of i is 0 to n, and n is determined according to the number of register bits and the data type. For example, when the number of register bits is 128 and the data type is byte, i is 4; when the number of register bits is 128 and the data type is half word, i is 2; and when the number of register bits is 128 and the data type is word, i is 1.

Based on the above intermediate vector scheme, for example, when the first opcode is VS.B, vj is the source register, the intermediate vector vec0={VR [vj].B [4i+3], VR [vj].B[4i+2], VR [vj].B[4i+1], VR [vj].B[4i]} is created; where, VR [vj].B [4i+3], VR [vj].B[4i+2], VR [vj].B[4i'₀ 1], VR [vj].B[4i] are all intermediate vector parameters; i represents the constant, [4i+0], [4i+1], [4i+2], and [4i+3] represent four consecutive positions in the register; and the value range of i is 0~3. Writing the content of each intermediate vector parameter to the corresponding position in the destination register vd can be represented as:

VR [vd].B[4i+0]=vec0.B[ui8 [1:0]]
VR [vd].B[4i+1]=vec0.B[ui8 [3:2]]
VR [vd].B[4i+2]=vec0.B[ui8 [5:4]]
VR [vd].B[4i+3]=vec0.B[ui8 [7:6]]

where, ui8 [1:0], ui8 [3:2], ui8 [5:4], and ui8 [7:6] are all immediate values, representing the index values corresponding to the intermediate vector. Specifically, the index of a first target element in the intermediate vector is expressed by the lowest two bits (ui8 [1:0]) of the immediate value ui8, the index of a second target element in the intermediate vector is expressed by third and fourth bits (ui8 [3:2]) of the immediate value ui8, the index of a third target element in the intermediate vector is expressed by fifth and sixth bits (ui8 [5:4]) of the immediate value ui8, and the index of a fourth target element in the intermediate vector is expressed by seventh and eighth bits (ui8 [7:6]) of the immediate value ui8.

Similarly, when the data type is half word and word, a method about the intermediate vector and index are the same as in the above example; when the instruction name of the opcode is XVS. {B/H/W}, two intermediate vectors will be required to achieve the vector shuffling operation. For example, when the first opcode is XVS.B, the intermediate vectors are represented as follows:

vec0={VR [vj].B[4i+3], VR [vj].B[4i+2], VR [vj].B[4i+1], VR [vj].B[4]}
vec1={VR [vj].B[4i+19], VR [vj].B[4i+18], VR [vj].B [4i+17], VR [vj]. B[4i+16]} where, the intermediate vectors are vec0 and vec1; VR [vj].B[4i+3], VR [vj].B[4i+2], VR [vj].B[4i+1], VR [vj].B[4] are the intermediate vector parameters of the intermediate vector vec0, VR [vj].B[4i+19], VR [vj].B[4i+18], VR [vj].B [4i+17], VR [vj].B[4i+16] are the intermediate vector parameters of the intermediate vector vec1; B indicates that the data type is byte, i represents the position of the element in the register, [4i+0], [4i+1], [4i+2] and [4i+3] represent four elements in consecutive positions of the register, and [4i+16], [4i+17], [4i+18] and [4i+19] represent four elements in consecutive positions of the register.

For example, when the first opcode is XVS.B, the data type is byte, and N1 is 4, the vector shuffling instruction "XVS.B vd, vj, ui8" represents reading four adjacent byte elements from the vector register vj to form one element group for shuffling, and then writing an obtained result into a vector register vd; when the first opcode is VS.H, the data type is half word, and N1 is 4, the vector shuffling instruction "VS.H vd, vj, ui8" represents reading four adjacent half word elements from the vector register vj to form one element group for shuffling, and then writing the obtained result into the vector register vd; when the first opcode is VS.W, the data type is word, and N1 is 4, the vector shuffling instruction "VS.W vd, vj, ui8" represents reading four adjacent word elements from the vector register vj to form one element group for shuffling, and then writing the obtained result into the vector register vd.

It can be understood that, the above examples are only listed for a better understanding of technical solutions of the present application, and should not be taken as an only limitation on the embodiments of the present application.

In the embodiment of the present application, the shuffling parameter is added to the vector shuffle instruction, where the shuffling parameter includes the index value and opcode. Based on the index value and opcode, the shuffling operation under the case where the number of source operands and the number of index values are different is implemented; it can be seen that, by adopting the technical solution of the present application, one vector shuffle instruction is used to achieve the shuffling operation under the case where the number of source operands and the number of index values are different. There is no need to add other instructions to pass the shuffling mode, nor is it necessary to obtain the shuffling mode through accessing memories, thereby effectively reducing a system overhead and improving execution efficiency of the vector shuffling operations.

Embodiment 3

Figure 3:
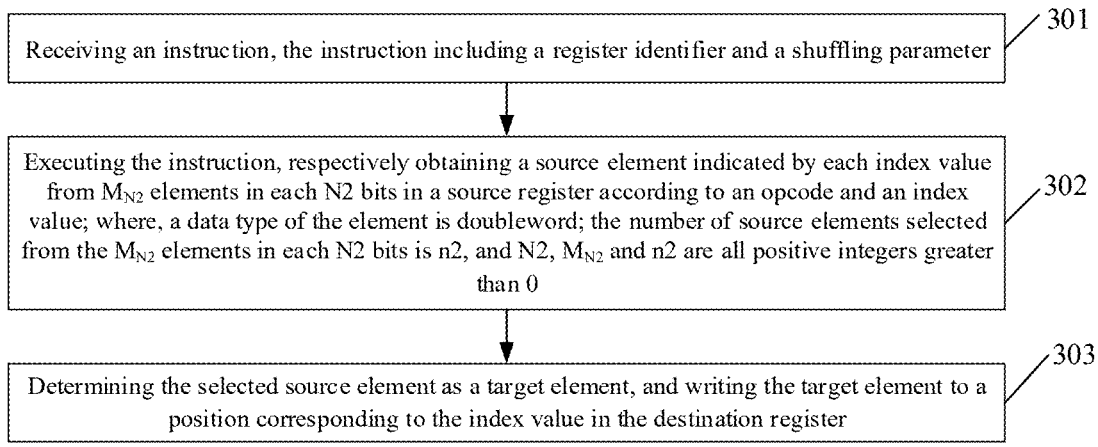
FIG. 3 is a step flowchart of a vector shuffling method provided by Embodiment 3 of the present application.

In a specific implementation of the present application, the opcode is a second opcode, and the number of index values is the same as the number of source elements. As shown in FIG. 3, a processing method of a vector shuffle instruction can include:

Step 301: receiving an instruction, the instruction including a register identifier and a shuffling parameter.

In the embodiment of the present application, the meaning of the instruction and the parameters included in the instruction are as described in Embodiments 1 and 2, which will not be elaborate here.

In an implementation, when the number of source registers is two, that is, the source elements come from two different registers; when the number of source registers is multiple, each source register identifier in all the source registers is different from a destination register identifier; alternatively, when the number of source registers is multiple, there exists one source register identifier among all the source registers that is the same as the destination register identifier.

In an implementation, the shuffling parameter includes an index value and an opcode; where, the index value is implemented in a form of an immediate value; the opcode is implemented in the form of an identifier that can be converted into a binary code, and the opcode is the second opcode. For example, when the opcode is the second opcode, the source register includes a first source register and a second source register, and the destination register is either the first source register or the second source register.

In an implementation, an instruction format is "opcode destination register, source register, immediate value". Based on the instruction format, in a specific implementation, the instruction can be represented as "[X] VS.D vd, vj, ui8"; [X] VS is an instruction name in the second opcode, D is a data type in the second opcode, D represents the data type being doubleword, [X] VS.D is the second opcode in the identifier form; Vd represents the destination register, vj and vd represent the source register, and ui8 represents the immediate value. Exemplarily, VS.D can be converted into the second opcode in a binary form. For example, VS.D can be converted into the second opcode in the binary form like 01110011100111. In addition, the immediate can be a set of data, such as expressing index values through different bits (such as ui8 [1:0], ui8 [3:2], ui8 [5:4], and ui8 [7:6]) of the immediate value ui8.

Step 302: executing the instruction, respectively obtaining the source element indicated by each index value from $M_{N2}$ elements in each N2 bits in the source register according to the opcode and the index value; where, the data type of the element is doubleword; the number of source elements selected from the $M_{N2}$ elements in each N2 bits is n2, and N2, $M_{N2}$ and n2 are all positive integers greater than 0.

In the embodiment of the present application, the number of index values is the same as the number of source elements, and the opcode is the second opcode. Obtaining the source elements indicated by each index value from the $M_{N2}$ elements in each N2 bits, the data type of the elements being doubleword, the number of source elements selected from the $M_{N2}$ elements in each N2 bits being n2, and all of N2, $M_{N2}$, and n2 being positive integers greater than 0 are determined as a selection rule.

In an implementation, there is the preset correspondence between the index values and element positions in each source register; and the element position can be an element address. In the source register, obtaining the source element indicated by each index value from the $M_{N2}$ elements in each N2 bits means that, obtaining a first source element indicated by each index value from the $M_{N2}$ elements in each N2 bits in the first source register, and obtaining a second source element indicated by each index value from the $M_{N2}$ elements in each N2 bits in the second source register; determining the first and second source elements as final selected source elements. Where, $M_{N2}$ elements can be sequentially-adjacent elements or cross-adjacent elements; for example, when $M_{N2}$ is four, assuming the source register includes eight elements, namely Element A1, Element A2, Element A3, Element A4, Element A5, Element A6, Element A7, and Element A8 respectively, $M_{N2}$ elements can be Elements A2 to A5, or cross-adjacent elements namely Element A1, Element A3, Element A5, and Element A7.

For example, when the second operand is [X] VS.D, N2 is 128, $M_{N2}$ is four, and n2 is 2.

In the specific implementation, the number of source registers is two, namely the first source register and the second source register. In the source register, obtaining the source element indicated by each index value from the $M_{N2}$ elements in each N2 bits respectively, including: in the first source register, obtaining the source element indicated by a first index value (such as ui8 [1:0]) from the $M_{N2}$ elements in each N2 bits; and in the first source register, obtaining the source element indicated by a second index value (such as ui8 [3:2]) from the $M_{N2}$ elements in each N2 bits; where, $M_{N2'}$ is half of $M_{N2}$; the number of source elements selected from the first source register is n2/2, and the number of source elements selected from the second source register is n2/2. When the number of source registers is multiple, a vector shuffling is performed in each source register by means of different bits of the immediate value, that is, the bits in the immediate value corresponding to different source registers are different; and performing an indexing by means of which bits of the immediate values depends on a specific situation, which will not be elaborate here.

Step 303: determining the selected source element as the target element, and writing the target element to a position corresponding to the index value in the destination register.

In the embodiment of the present application, there is the preset correspondence between the immediate value and the addresses in the destination register. In an implementation, writing the target element to the position corresponding to the immediate value in the destination register means that, determining the position corresponding to the immediate value from the destination register, and storing the source elements sequentially in the determined positions.

Furthermore, in a feasible solution, a step for creating an intermediate vector can be added between Steps 301 and 302. Specifically, before selecting the source elements from the source register according to the determined position information and the number of source elements, creating the intermediate vector; the intermediate vector includes at least one intermediate vector parameter, and when there is an element group, the number of intermediate vector parameters is equal to the number of element groups; when there is no element group, the number of intermediate vector parameters is equal to the number of source elements. Based on the created intermediate vector, after Step 302, i.e., after selecting the source element from the source register, storing each selected source element respectively in the corresponding intermediate vector parameter in the intermediate vector; where, there is a one-to-one correspondence between the intermediate vector parameters and the selected source elements; and Step 303 is to write content of each intermediate vector parameter to the corresponding position of the destination register according to the immediate value. Where, a method for creating the intermediate vector is the same as that in Embodiment 2, which will not be elaborate here.

In an implementation, writing the content of each intermediate vector parameter to the corresponding position in the destination register according to the immediate value means that, perform the following operation for each intermediate vector parameter: writing the content of the intermediate vector parameter to the position indicated by the index value corresponding to the intermediate vector parameter in the destination register.

Based on the above scheme of the intermediate vector, for example, when the second opcode is VS.D, an instruction format is VS.D vd, vj, ui8, where vj, and vd are source registers, creating the intermediate vector vec0={VR [vj], VR [vd]}, and writing the content of each intermediate vector parameter to the corresponding position in the destination register vd, which can be represented as:

VR [vd].D [0]=vec0.D [ui8 [1:0]]
VR [vd] D [1]=vec0.D [ui8 [3:2]]
where, ui8 [1:0] and ui8 [3:2] are both immediate values, representing the index values corresponding to the register. Specifically, the lowest two bits (ui8 [1:0]) of the immediate ui8 represent the index of a first target element in the source register, while the third and fourth bits (ui8 [3:2]) of the immediate ui8 represent the index of a second target element in the source register.

When the second opcode is XVS.D, two intermediate vectors will be required to perform a vector shuffling operation. For example, the intermediate vector is shown as follows:

Vec0={XR [x] [127:0], XR [xd][127:0]}
Vec1={XR [xj] [255:128], XR [xd][255:128]}
where, the intermediate vectors are vec0 and vec1; XR [x] [127:0] and XR [xd][127:0] represent the intermediate vector parameters of vec0, XR [x] [255:128] and XR [xd][255:128] represent the intermediate vector parameters of vec1; D indicates that the data type is doubleword and 64 bits wide.

For example, when the second opcode is VS.D, the data type is doubleword, N2 is 128, $M_{N2}$ is four, and n2 is 2, the vector shuffling instruction "VS.D vd, vj, ui8" represents selecting two doubleword elements from quad word elements in each 128 bits of the vector register vj and vector register vd according to the content of the immediate value, and writing an obtained result into the corresponding 128 bits of the vector register vd; when the second opcode is XVS.D, the data type is doubleword, N2 is 128, $M_{N2}$ is four, and n2 is 2, the vector shuffling instruction "XVS.D vd, vj, ui8" means reading two doubleword elements from quad word elements in each 128 bits of the vector register xj and vector register xd according to the content of the immediate value, and then writing the read doubleword elements into the corresponding 128 bits of xd.

In the embodiment of the present application, there is one source register among the two source registers which is the same as the destination register, that is, there is one register that is both the source register and the destination register. By adopting the above technical solution, executing the shuffling instruction each time can overwrite half of the elements in the destination register, which can be applied in software application scenarios that require to perform corresponding operations.

In the embodiment of the present application, the shuffling parameter is added to the vector shuffle instruction, where the shuffling parameter includes the index value and opcode. Based on the index value and opcode, the shuffling operation in the case where the number of source operands and the number of index values are the same, the data type is doubleword, and the register is 128 bits is implemented. It can be seen that, by adopting the technical solution of the present application, the shuffling operation in the case where the number of source operands and the number of index values are different, and the data type is a doubleword is implemented by means of one vector shuffling instruction, there is no need to add other instructions to pass a shuffling mode, nor is it necessary to obtain the shuffling mode through accessing memories, thereby effectively reducing a system overhead and improving execution efficiency of the vector shuffling operation.

Embodiment 4

Figure 4:
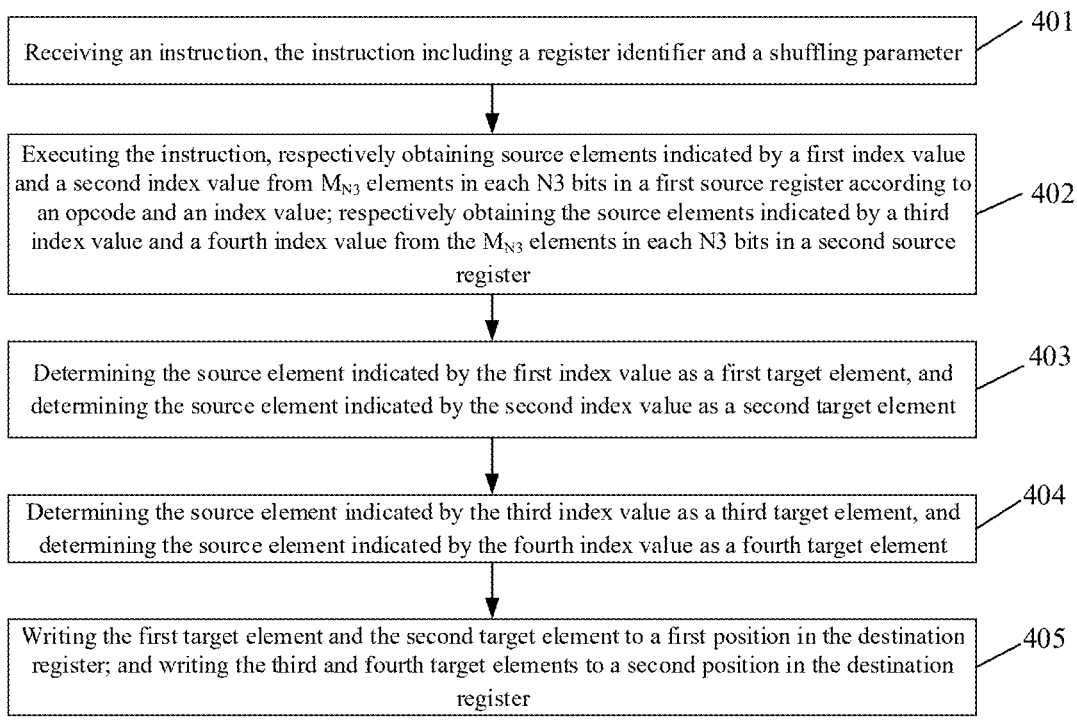
FIG. 4 is a step flowchart of a vector shuffling method provided by Embodiment 4 of the present application.

In a specific implementation of the present application, the opcode is a third opcode, and an index value includes a first index value, a second index value, a third index value, and a fourth index value, the first index value, the second index value, the third index value, and the fourth index value index the same or different positions respectively. As shown in FIG. 4, a processing method of a vector shuffle instruction can include:

Step 401: receiving an instruction, the instruction including a register identifier and a shuffling parameter.

In the embodiment of the present application, meanings of the instruction and the parameter included in the instruction are as described in Embodiments 1, 2, and 3, which will not be elaborate here.

In an implementation, the number of source registers is two, that is, source elements come from two different registers. When the number of source registers is multiple, each source register identifier in all source registers is different from the destination register identifier; alternatively, when the number of source registers is multiple, there exists one source register identifier among all the source registers that is the same as the destination register identifier.

In an implementation, the shuffling parameter includes the index value and opcodes; where, the index value is implemented in a form of an immediate value; the opcode is implemented in the form of identifier that can be converted into a binary code, and the opcode is the third opcode. For example, when the opcode is the third opcode, the source register includes a first source register and a second source register, and the destination register is either the first source register or the second source register.

In an implementation, an instruction format is "opcode destination register, source register, immediate value". Based on the instruction format, in the specific implementation, the instruction can be represented as "[X] VP.W vd/xd, vj/xj, ui8"; [X] VP is an instruction name in the third opcode, W is a data type in the third opcode, W represents that the data type is word, [X] VP.W is the third opcode in the form of identifier; vd/xd represents the destination register, vj and vd represent the source registers (or xj and xd represent the source registers), and ui8 represents the immediate value. Exemplarily, VP.W is the third opcode that can be converted into a binary form, such as converting VP.W to the third opcode in the binary form, namely 01110011111001. In addition, the immediate value can be a set of data, such as expressing index values through different bits of the immediate ui8, namely ui8 [1:0], ui8 [3:2], ui8 [5:4], and ui8 [7:6].

Step 402: executing the instruction, respectively obtaining the source elements indicated by the first index value and the second index value from $M_{N3}$ elements in each N3 bits in the first source register according to the opcode and the index value; respectively obtaining the source elements indicated by the third index value and the fourth index value from the $M_{N3}$ elements in each N3 bits in the second source register.

Where, the data type of the element is word; the number of source elements selected from the $M_{N3}$ elements in each N3 bits is n3, and N3, $M_{N3}$, and n3 are all positive integers greater than 0.

In the embodiment of the present application, the index value includes four index values, namely: the first index value, the second index value, the third index value, and the fourth index value, and the first index value, second index value, third index value, and fourth index value index different positions respectively. When the number of source registers is multiple, each source register performs a vector shuffling by means of different bits of the immediate value, that is, the bits in the immediate values corresponding to different source registers are different; and performing an indexing according to which bits of the immediate values depends on a specific situation and will not be elaborate here. For example, when the third opcode is [X] VP.W, the first index value is ui8 [1:0], the second index value is ui8 [3:2], the third index value is ui8 [5:4], and the fourth index value is ui8 [7:6].

In addition, the number of index values is the same as the number of source elements; selecting the source elements indicated by each index value from the $M_{N3}$ elements in each N3 bit, the data type being word, the number of source elements selected from the $M_{N3}$ elements in each N3 bit being n3, and N3, $M_{N3}$, and n3 all being positive integers greater than 0 are determined as a selection rule. Where, the $M_{N3}$ elements can be sequentially-adjacent elements or cross-adjacent elements; for example, when $M_{N3}$ is four, assuming the source register includes eight elements, namely Element A1, Element A2, Element A3, Element A4, Element A5, Element A6, Element A7, and Element A8, $M_{N3}$ elements can be Elements A2 to A5, or can be the cross-adjacent elements namely Element A1, Element A3, Element A5, and Element A7.

In an implementation, there is a preset correspondence between the index values and element positions in each source register; the element position can be an element address. In the source register, obtaining the source elements indicated by each index value from the $M_{N3}$ elements of each N3 bit means that, respectively obtaining the source elements indicated by the first index value and the second index value from the $M_{N3}$ elements of each N3 bit in the first source register; and respectively obtaining the source elements indicated by the third index value and the fourth index value from the $M_{N3}$ elements of each N3 bit in the second source register.

For example, when the third opcode is [X] VP.W, N3 is 128, $M_{N3}$ is four, and n3 is 2.

After the source element indicated by each index value is obtained from the $M_{N3}$ elements of each N3 bit in the source register, steps 403 and 404 will be executed.

Step 403: determining the source element indicated by the first index value as a first target element, and determining the source element indicated by the second index value as a second target element.

In the embodiment of the present application, the source element indicated by the first index value selected from the first source register is determined as the first target element, and the source element indicated by the second index value selected from the first source register is determined as the second target element.

Step 404: determining the source element indicated by the third index value as a third target element, and determining the source element indicated by the fourth index value as a fourth target element.

In the embodiment of the present application, the source element indicated by the third index value selected from the second source register is determined as the third target element, and the source element indicated by the fourth index value selected from the second source register is determined as the fourth target element.

In the embodiment of the present application, steps 403 and 404 can be executed simultaneously or sequentially, with no constraint on execution order; after completing both of Steps 403 and 404, Step 405 will be executed.

Step 405: writing the first target element and the second target element to a first position in the destination register; and writing the third and fourth target elements to a second position in the destination register.

In the embodiment of the present application, there is the preset correspondence between the immediate value and addresses in the destination register. In an implementation, writing the target elements to the positions corresponding to the immediate value in the destination register means that, determining the positions corresponding to the immediate value from the destination register, and storing the source elements sequentially in the determined positions.

In the embodiment of the present application, when the opcode is the third opcode, after the first target element, the second target element, the third target element, and the fourth target element are obtained, the first target element and the second target element can be written to the first position in the destination register, and the third and fourth target elements can be written to the second position in the destination register.

For example, when the third opcode is VP.W/XVP.W (be shorten as [X] VP.W), the data type is word, N3 is 128, $M_{N3}$ is four, and n3 is 2, the vector shuffling instruction "[X] VP.W vd, vj, ui8" represents using values namely ui8 [1:0] and ui8 [3:2] as index values, selecting two from each of quad word elements in every 128 bits of the vector register vj/xj and writing them respectively to $0^{th}$ and $1^{st}$ word elements corresponding to 128 bits of the vector register vd/xd; using values namely ui8 [5:4] and ui8 [7:6] as index values, selecting two from each of the quad word elements in every 128 bits of the vector register vd/xd and writing them respectively to $2^{nd}$ and $3^{rd}$ word elements corresponding to 128 bits of the vector register vd/xd.

In the embodiment of the present application, the shuffling parameter is added to the vector shuffling instruction, where the shuffling parameter includes the index value and the opcode. Based on the index value and opcode, the shuffling operation is a case where the number of source operands and the number of index values are the same and the data type is word is implemented; it can be seen that, by adopting a technical solution of the present application, the vector shuffle instruction in the case where the number of source operands and the number of index values are the same, and the data type is word is implemented by means of one vector shuffling instruction, there is no need to add other instructions to pass a shuffling mode, nor is it necessary to obtain the shuffling mode through accessing memories, thereby effectively reducing a system overhead and improving execution efficiency of the vector shuffling operation.

Embodiment 5

Figure 5:
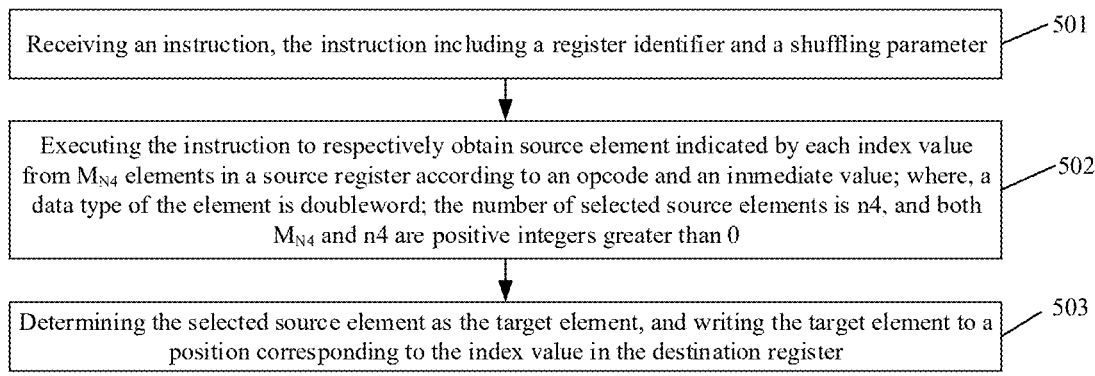
FIG. 5 is a step flowchart of a vector shuffling method provided by Embodiment 5 of the present application.

In a specific implementation of the present application, the opcode is a fourth opcode, and the number of index values is the same as the number of source elements. As shown in FIG. 5, a processing method of a vector shuffle instruction can include:

Step 501: receiving an instruction, the instruction including a register identifier and a shuffling parameter.

In the embodiment of the present application, meanings of the instruction and the parameter included in the instruction are as described in Embodiments 1 to 4, which will not be elaborate here.

In an implementation, the number of source registers is one, that is, the source element comes from one register.

In an implementation, the shuffling parameter includes an index value and an opcode; where, the index value is implemented in a form of an immediate value; the opcode is implemented in the form of an identifier that can be converted into a binary code, and the opcode is the fourth opcode.

In an implementation, an instruction format is "opcode destination register, source register, immediate value". Based on the instruction format, in specific implementation, the instruction can be represented as XVP.D xd, xj, ui8; where XVP is an instruction name in the fourth opcode, D is a data type in the fourth opcode, D represents the data type as doubleword, XVP.D is the fourth opcode in the form of identifier; xd represents the destination register, xj represents the source register, and ui8 represents the immediate value. Exemplarily, XVP.D can be converted into the fourth opcode in a binary form, such as converting XVP.D to the fourth opcode in the binary form namely 01110111111010. In addition, the immediate can be a set of data, such as expressing the index values through different bits, namely ui8 [1:0], ui8 [3:2], ui8 [5:4], and ui8 [7:6], of the immediate ui8.

Step 502: executing the instruction to respectively obtain the source element indicated by each index value from $M_{N4}$ elements in the source register according to the opcode and immediate value; where, the data type of the element is doubleword; the number of selected source elements is n4, and both $M_{N4}$ and n4 are positive integers greater than 0.

In the embodiment of the present application, the opcode is the fourth opcode, and the fourth opcode can be used to indicate the element with the doubleword data type that obtained from the source register. The number of index values is the same as the number of source elements; multiple conditions such as obtaining the source elements indicated by each index value from the $M_{N4}$ elements, the data type of the source elements being doubleword, the number of selected source elements being n4, and both $M_{N4}$ and n4 being positive integers greater than 0 are determined as the selection rule. Where, the $M_{N4}$ elements can be sequentially-adjacent elements or cross-adjacent elements. For example, when $M_{N4}$ is four, assuming the source register includes eight elements, namely Element A1, Element A2, Element A3, Element A4, Element A5, Element A6, Element A7, and Element A8, the $M_{N4}$ elements can be Elements A2 to A5, or the cross-adjacent elements namely Element A1, Element A3, Element A5, and Element A7.

In an implementation, there is a preset correspondence between the index values and element positions in each source register; the element position can be an element address. After determining the selection rule according to the fourth opcode and the index value, the source element indicated by each index value can be obtained respectively from the $M_{N4}$ elements in the source register, the data type of the obtained source element is doubleword, and the number of selected source elements is n4, $M_{N4}$ and n4 are both positive integers greater than 0.

For example, when the fourth opcode is XVP.D, $M_{N4}$ is four and n4 is four.

Step 503: determining the selected source element as the target element, and writing the target element to a position corresponding to the index value in the destination register.

In the embodiment of the present application, there is the preset correspondence between the immediate values and the addresses in the destination register. In an implementation, writing the target element to the position corresponding to the immediate value in the destination register means that, determining positions corresponding to the immediate values from the destination register, and storing the source elements sequentially in the determined positions.

For example, when the fourth opcode is XVP.D, the data type is doubleword, $M_{N4}$ is four, and n4 is four, the vector shuffling instruction "XVP.D xd, xj, ui8" means using values namely ui8 [1:0], ui8 [3:2], ui8 [5:4], and ui8 [7:6] as index values, selecting the source element indicated by each index value from four doubleword elements in vector register xj, and sequentially writing the source elements into the four doubleword elements in the vector register xd.

In the embodiment of the present application, the shuffling parameter is added to the vector shuffle instruction, where the shuffling parameter includes the index value and opcode. Based on the index value and opcode, a shuffling operation is a case where the number of source operands and the number of index values are the same, the data type is doubleword, and the register is 256 bits is implemented; it can be seen that, by adopting a technical solution of the present application, the vector shuffle operation in the case where the number of source operands and the number of index values are the same, the data type is doubleword, and the register is 256 bits is implemented by means of one vector shuffling instruction, there is no need to add other instructions to pass a shuffling mode, nor is it necessary to obtain the shuffling mode through accessing memories, thereby effectively reducing a system overhead and improving execution efficiency of the vector shuffling operation.

Embodiment 6

Figure 6:
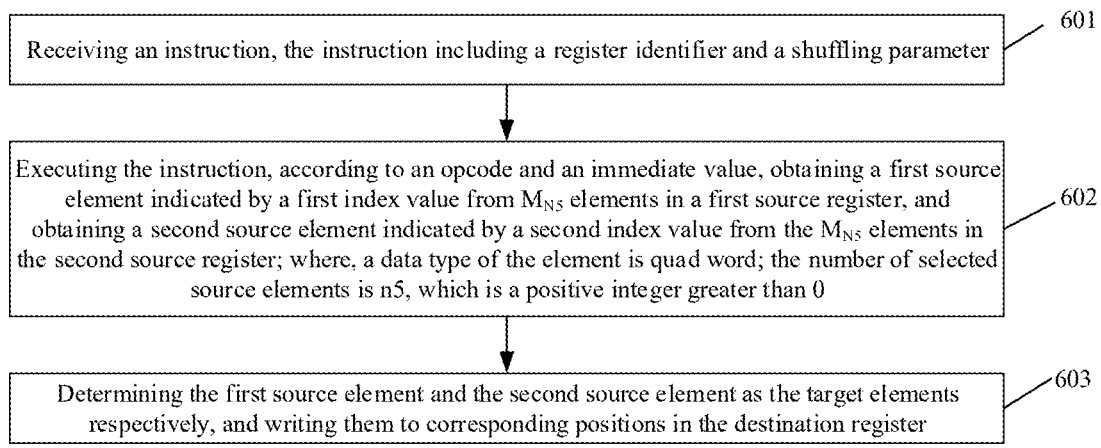
FIG. 6 is a step flowchart of a vector shuffling method provided by Embodiment 6 of the present application.

In a specific implementation of the present application, the opcode is a fifth opcode, an index value includes a first index value and a third index value, the first index value and the third index value index different positions respectively; and the source register includes a first source register and a second source register. As shown in FIG. 6, a processing method of a vector shuffle instruction can include:

Step 601: receiving an instruction, the instruction including a register identifier and a shuffling parameter.

In the embodiment of the present application, meanings of the instruction and parameters included in the instruction are as described in Embodiment 1 to 5, which will not be elaborate here.

In an implementation, the number of source registers is two, that is, source elements come from two different registers; when the number of source registers is multiple, each source register identifier in all source registers is different from a destination register identifier; alternatively, when the number of source registers is multiple, there exists one source register identifier among all the source registers that is the same as the destination register identifier.

In an implementation, the shuffling parameter includes an index value and an opcode; where, the index value is implemented in a form of an immediate value; and the opcode is implemented in the form of an identifier that can be converted into a binary code, the opcode is the fifth opcode. For example, when the opcode is the fifth opcode, the source register includes the first source register and the second source register, and the destination register is either the first source register or the second source register.

In an implementation, an instruction format is "opcode destination register, source register, immediate value". Based on the instruction format, in the specific implementation, the instruction can be represented as XVP.Q vd/xd, vj/xj, ui8; XVP is an instruction name in the fifth opcode, Q is a data type in the fifth opcode, Q represents that the data type is quad word, XVP.Q is the fifth opcode in the form of identifier; xd represents the destination register, xj and xd represent the source register, and ui8 represents the immediate value. Exemplarily, XVP.Q can be converted into the fifth opcode in a binary form, such as converting XVP.Q to the fifth opcode in the binary form like 01110111111011. In addition, the immediate value can be a set of data, such as expressing the index values through different bits, namely ui8 [1:0], ui8 [5:4], of the immediate value.

Step 602: executing the instruction, according to the opcode and immediate value, obtaining the first source element indicated by the first index value from $M_{N5}$ elements in the first source register; and obtaining the second source element indicated by the second index value from the $M_{N5}$ elements in the second source register; where, the data type of the element is quad word; the number of selected source elements is n5, which is a positive integer greater than 0.

In the embodiment of the present application, the opcode can be a fifth opcode, which can be used to indicate the element with the data type of quad word that obtained from the source register. The index value includes two index values, namely: the first index value and the third index value. The first index value and the third index value index different positions respectively; and the first index value and the third index value represent different bits of the same immediate value respectively. For example, the first index value represents low bits of the immediate value ui8, and the third index value represents high bits of the immediate value ui8. In addition, the first index value can also represent the lowest two bits of the immediate value ui8, and the third index value can also represent the second lowest two bits of the immediate value ui8. For example, when the fifth opcode is XVP.Q, the first index value is ui8 [1:0], and the third index value is ui8 [5:4]. When the number of source registers is multiple, each source register performs a vector shuffling through different bits of the immediate value, that is, bits in the immediate value corresponding to different source registers are different; and performing an indexing by means of which bits of the immediate values depends on a specific situation, which will not be elaborate here.

In addition, the number of index values is the same as the number of source elements; multiple conditions such like obtaining the first source element indicated by the first index value from $M_{N5}$ elements in the first source register, obtaining the second source element indicated by the second index value from the $M_{N5}$ elements in the second source register, the data type of the element being quad word, the number of selected source elements being n5, and n5 being a positive integer greater than 0 are determined as a selection rule. Where, the $M_{N5}$ elements can be sequentially-adjacent elements or cross-adjacent elements. For example, when $M_{N5}$ is four, assuming the source register includes eight elements, namely Element A1, Element A2, Element A3, Element A4, Element A5, Element A6, Element A7, and Element A8 respectively, $M_{N5}$ elements can be Elements A2 to A5, or cross-adjacent elements namely Element A1, Element A3, Element A5, and Element A7.

In an implementation, there is a preset correspondence between the index values and element positions in each source register; the element position can be an element address. After determining the selection rule according to the fifth opcode and index value, the first source element indicated by the first index value can be obtained from $M_{N5}$ elements in the first source register, and the second source element indicated by the second index value can be obtained from $M_{N5}$ elements in the second source register. The number of source elements selected from the first source register is n3/2, and the number of source elements selected from the second source register is n3/2. When the number of source registers is multiple, each source register performs a vector shuffling through different bits of the immediate value, that is, bits in the immediate value corresponding to different source registers are different; and performing an indexing by means of which bits of the immediate values depends on a specific situation, which will not be elaborate here.

For example, when the fifth opcode is XVP.Q, $M_{N5}$ is two and n3 is two.

After the first source element and second source element are obtained, Step 603 will be executed.

Step 603: determining the first source element and the second source element as the target elements respectively, and writing them to corresponding positions in the destination register.

In the embodiment of the present application, there is a preset correspondence between the immediate value and the address in the destination register. In an implementation, writing the target element to the position corresponding to the immediate value in the destination register means that, determining the positions corresponding to the immediate values from the destination register, and storing the source elements sequentially in the determined positions.

In the embodiment of the present application, when the opcode is the fifth opcode, after obtaining the first source element and the second source element, the first source element can be determined as the target element and be written to a first position of the destination register, and the second source element can be determined as the target element and be written to a second position of the destination register. The first and second positions are determined by the index values respectively.

For example, when the fifth opcode is XVP.Q, the data type is quad word, $M_{N5}$ is two, and n3 is two, the vector shuffling instruction "XVP.Q xd, xj, ui8" represents selecting one source element from two quad word elements of the vector register xj according to values of ui8 [1:0] and ui8 [5:4], selecting one source element from the two quad word elements of the vector register xd, and writing the selected two source elements into the two quad word elements of the vector register xd according to the index value.

In the embodiment of the present application, the shuffling parameter is added to the vector shuffle instruction, where the shuffling parameter includes the index value and an opcode. Based on the index value and opcode, a shuffling operation in the case where the number of source operands is the same with the number of index values and the data type is quad word is implemented; it can be seen that, by adopting a technical solution of the present application, the vector shuffle instruction in the case where the number of source operands and the number of index values are the same, and the data type is quad word is implemented by means of one vector shuffling instruction, there is no need to add other instructions to pass a shuffling mode, nor is it necessary to obtain the shuffling mode through accessing memories, thereby effectively reducing a system overhead and improving execution efficiency of the vector shuffling operation.

Embodiment 7

Figure 7:
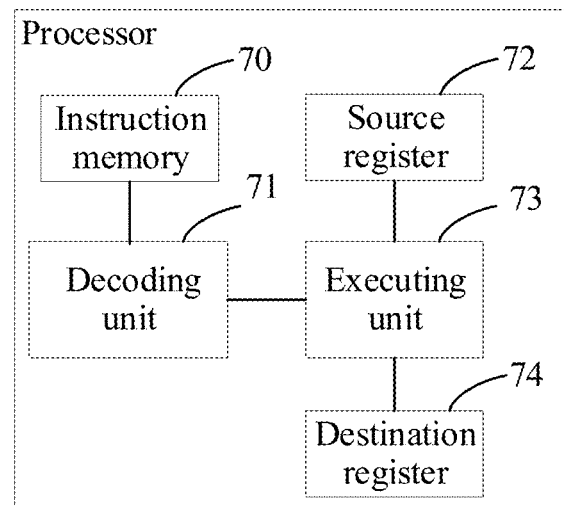
FIG. 7 is a structural diagram of a processor provided by an embodiment of the present application.

Referring to FIG. 7, which shows a structure diagram of a processor provided by an embodiment of the present application.

As shown in FIG. 7, the processor may include:
multiple vector registers, where the multiple vector registers include a source register 72 and a destination register 74, and the source register 72 is used to store a data element;
a decoding unit 71, configured to decode a vector shuffling instruction; where the vector shuffling instruction includes: a register identifier and a shuffling parameter, and the register identifier includes a source register identifier and a destination register identifier;
an executing unit 73, configured to perform a vector shuffling operation on the source element obtained from the source register 72 according to the shuffling parameter in response to the vector shuffle instruction, obtain the target element after performing the vector shuffling operation, and write the target element into the destination register 74.

In an implementation, the instruction is stored in an instruction memory 70.

In an implementation, the executing unit 73 is configured to determine position information of the source elements in the source register 72 and the number of source elements according to the shuffling parameter; where the number of selected source elements is one or more; select the source elements from the source register according to the determined position information and the number of source elements; and determine all the selected source elements as the target elements.

In an implementation, the shuffling parameter includes an index value and an opcode; the index value is used to indicate the position information of each source element required for the vector shuffling operation in the source register; and the opcode is used to characterize an operation performed on the source register and the destination register;
the executing unit 73 is configured to determine a selection rule for obtaining the source element according to the index value and the opcode; and obtain the source element indicated by each index value respectively from the source register 72 according to the selection rule.

In an implementation, the executing unit 73 is configured to determine a grouping method for the source elements according to the number of index values when the number of index values is different from the number of source elements, and determine the selection rule according to the grouping method and the opcode; determine the selection rule according to the opcode when the number of index values is the same as the number of source elements.

In an implementation, the executing unit 73 is configured to form each N1 adjacent elements in the source register into a set of element group; where a data type of the element is any one of byte, half word, or word; N1 is a positive integer greater than 0; determine the elements in each element group as initial source elements; obtain the source element indicated by each index value respectively from the initial source elements; and the number of source elements selected from each element group is n1.

In an implementation, the adjacent elements refer to the elements in the source register that are sequentially adjacent in position, and element addresses in multiple adjacent element groups may be partially identical or completely different;
where, the data types of the elements included in each element group are the same; and the data types of elements included in different element groups are the same or different.

In an implementation, the opcode is a second opcode, and the number of index values is the same as the number of source elements;
the executing unit 73, configured to respectively obtain the source element indicated by each index value from $M_{N2}$ elements in each N2 bits in the source register;
where the data type of the element is doubleword; the number of source elements selected from the $M_{N2}$ elements in each N2 bits is n2, and N2, $M_{N2}$, and n2 are all positive integers greater than 0.

In an implementation, the executing unit 73 is configured to create an intermediate vector, where the intermediate vector includes at least one intermediate vector parameter, when there is the element group, the number of intermediate vector parameters is equal to the number of element groups; when there is no element group, the number of intermediate vector parameters is equal to the number of source elements; store each of the selected source elements respectively in corresponding intermediate vector parameter in the intermediate vector; where, there is a one-to-one correspondence between the intermediate vector parameters and the selected source elements; and write content of each intermediate vector parameter to the corresponding position in the destination register according to the shuffling parameter.

In an implementation, the opcode is a third opcode; the index values include a first index value, a second index value, a third index value, and a fourth index value; the first index value, the second index value, the third index value, and the fourth index value index different positions respectively; and the source register includes a first source register and a second source register;
the executing unit 73 is configured to respectively obtain the source elements indicated by the first index value and the second index value from $M_{N3}$ elements in each N3 bits in the source register 72; respectively obtain the source elements indicated by the third index value and the fourth index value from the $M_{N3}$ elements in each N3 bits in the second source register; where the data type of the element is word; the number of source elements selected from the $M_{N3}$ elements in each N3 bits is n3, and N3, $M_{N3}$, and n3 are all positive integers greater than 0; determine the source element indicated by the first index value as a first target element, and determine the source element indicated by the second index value as a second target element; determine the source element indicated by the third index value as a third target element, and determine the source element indicated by the fourth index value as a fourth target element; write the first target element and the second target element to a first position in the destination register; and write the third and fourth target elements to a second position in the destination register.

In an implementation, the opcode is a fourth opcode;
the executing unit 73 is configured to respectively obtain the source element indicated by each index value from $M_{N4}$ elements in the source register; where the data type of the element is doubleword; the number of selected source elements is n4, and both $M_{N4}$ and n4 are positive integers greater than 0.

In an implementation, the opcode is a fifth opcode; the index values include the first index value and the third index value, where the first index value and the third index value index different positions respectively; the source register includes the first source register and the second source register;
the executing unit 73 is configured to obtain the first source element indicated by the first index value from $M_{N5}$ elements in the first source register; and obtain the second source element indicated by the third index value from the $M_{N5}$ elements in the first source register; where the data type of the element is quad word;
the number of selected source elements is n5, where n5 is a positive integer greater than 0; determine the first source element and the second source element as the target elements respectively, and write them into the corresponding positions of the destination register.

In an implementation, the number of source registers is one or more, and the number of destination registers is one;
when the number of source registers is one, the source register identifier and the destination register identifier can be the same or different; and
when the number of source registers is multiple, each source register identifier in all source registers is different from the destination register identifier; alternatively, when the number of source registers is multiple, there exists one source register identifier among all the source registers that is the same as the destination register identifier.

The processor provided by the embodiment of the present application can perform the vector shuffling operation on the elements obtained from the source register by adding the register identifier and shuffling parameter to the instructions and in combination with the shuffling parameter. Therefore, the vector shuffling operation with a specific function can be implemented through one instruction, without a need for multiple instructions to perform the shuffling operation to achieve the specific function, thereby improving execution efficiency of specific functions.

Embodiment 8

Figure 8:
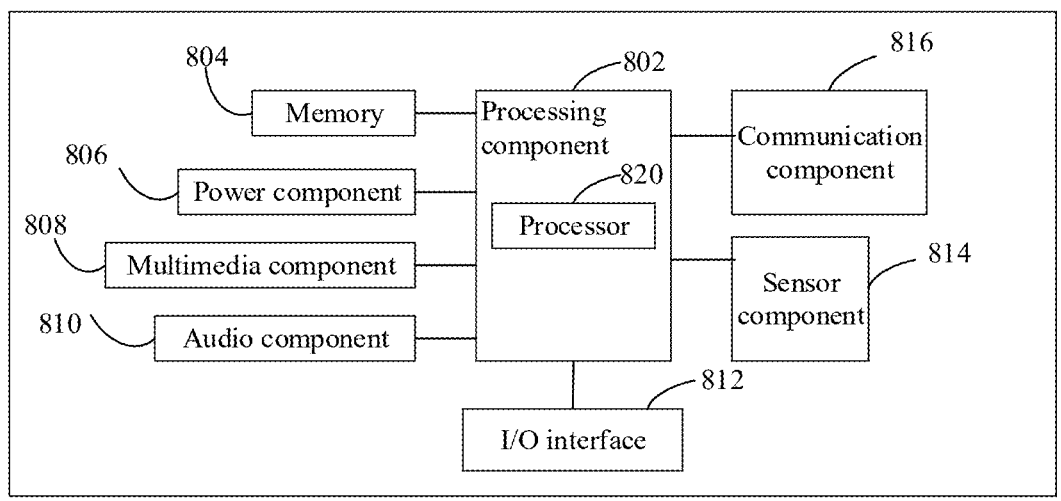
FIG. 8 is a structural diagram of an electronic device provided by an embodiment of the present application.

As shown in FIG. 8, an electronic device may include one or more of the following components: a processing component 802, a memory 804, a power component 806, a multimedia component 808, an audio component 810, an input/output (I/O) interface 812, a sensor component 814, and a communication component 816.

The processing component 802 typically controls an overall operation of the electronic device, such as operations associated with displays, data communications, camera operations, and recording operations. The processing element 802 may include one or more processors 820 to execute instructions, so as to complete all or part of steps of the above method. In addition, the processing component 802 may include one or more modules to facilitate interactions between the processing component 802 and other components. For example, the processing component 802 may include a multimedia module to facilitate the interaction between the multimedia component 808 and the processing component 802.

The memory 804 is configured to store various types of data to support operations on the electronic device. Examples of these data include instructions for any application or method used to operate on the electronic device, contact data, phone book data, messages, images, videos, and the like. The memory 804 can be implemented by any type of volatile or non-volatile storage device or their combination, such as static random access memory (SRAM), electrically erasable programmable read-only memory (EEPROM), erasable programmable read-only memory (EPROM), programmable read only memory (PROM), read-only memory (ROM), magnetic memory, flash memory, magnetic disk or optical disc.

The power component 806 provides power to various components of the electronic device. The power component 806 may include a power management system, one or more power sources, and other components associated with generating, managing, and distributing power for a terminal 800.

The multimedia component 808 includes a screen providing an output interface between the electronic device and a user. In some embodiments, the screen may include a liquid crystal display (LCD) and a touch panel (TP). If the screen includes the touch panel, the screen can be implemented as a touch screen to receive input signals from the user. The touch panel includes one or more touch sensors to sense touches, sliding, and gestures on the touch panel. The touch sensor can not only sense boundaries of touch or sliding actions, but also detect a duration and pressure associated with the touch or sliding operation. In some embodiments, the multimedia component 808 includes a front facing camera and/or a rear facing camera. When the electronic device is in an operation mode, such as shooting mode or video mode, the front facing camera and/or rear facing camera can receive external multimedia data. Each of the front and rear facing camera can be a fixed optical lens system or have focal length and optical zoom capabilities.

The audio component 810 is configured to output and/or input audio signals. For example, the audio component 810 includes a microphone (MIC), which is configured to receive external audio signals when the terminal is in the operation modes such as call mode, record mode, and speech recognition mode. The received audio signal can be further stored in the memory 804 or transmitted through the communication component 816. In some embodiments, the audio component 810 also includes a speaker for outputting the audio signal.

The I/O interface 812 provides an interface between the processing component 802 and peripheral interface modules, which can be keyboards, click wheels, buttons, and the like. These buttons may include but are not limited to: home button, volume button, start button, and lock button.

The sensor component 814 includes one or more sensors, configured to provide status evaluations of various aspects for the electronic device 800. For example, the sensor component 814 can detect open/closed state of the electronic device 800, a relative positioning of components, such as the components are the display and keyboard of the terminal; the sensor component 814 can also detect position changes of the terminal or one component of the terminal, presence or absence of a user contact with the electronic device, an orientation or an acceleration/deceleration of the electronic device, and temperature changes of the electronic device. The sensor component 814 may include a proximity sensor, configured to detect the presence of nearby objects without any physical contact. The sensor component 814 may also include an optical sensor, such as CMOS or CCD image sensor, configured to use in imaging applications. In some embodiments, the sensor component 814 may also include an accelerometer, a gyroscope sensor, a magnetic sensor, a pressure sensor, or a temperature sensor.

The communication component 816 is configured to facilitate wired or wireless communication between the electronic device and other devices. The electronic device can access wireless networks based on communication standards, such as WiFi, 2G/3G/4G/5G, or a combination of them. In an exemplary embodiment, the communication component 816 receives broadcast signals or broadcast related information from an external broadcast management system via a broadcast channel. In an exemplary embodiment, the communication component 816 further includes a near-field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology, and other technologies.

In exemplary embodiments, the electronic device may be implemented by one or more application specific integrated circuits (ASIC), digital signal processors (DSPD), digital signal processing devices (DSPD), programmable logic devices (PLD), field programmable gate arrays (FPGA), controllers, microcontrollers, microprocessors, or other electronic components, so as to perform the above vector shuffling method.

In exemplary embodiments, there is also provided a non-temporary computer-readable storage medium that includes instructions, such as the memory 804 including the instruction, where the above instruction can be executed by the processor 820 of the electronic device to complete the vector shuffling method described above. For example, the non-temporary computer-readable storage medium may be a ROM, a random access memory (RAM), a CD-ROM, a magnetic tape, a floppy disk, an optical data storage device, and the like.

The electronic device in the embodiment of the present application is used to implement the corresponding vector shuffling method in the above multiple method embodiments, and has beneficial effects of the corresponding method embodiments, which will not be elaborate here.

Various embodiments in this description are described in a progressive manner, and each embodiment focuses on differences from other embodiments. The same and similar parts between respective embodiments can be referred to each other. For the apparatus embodiment, due to a fact that it is basic similarly with the method embodiment, the description is relatively simple. Please refer to section of the method embodiment for relevant information.

The above provides a detailed introduction to the vector shuffling method, the processor, and the electronic device provided by the present application. This article applies specific examples to explain principles and implementations of the present application. The description about the above embodiments is only used to help understand the methods and core ideas of the present application; meanwhile, for general technical personnel in this field, there may be changes in specific implementations and application scopes according to the ideas of the present application. In summary, content of this specification should not be understood as a limitation on the present application.

Algorithms and displays provided here are not inherently related to any specific computer, electronic system, or other device. Various universal systems can also be used in conjunction with teaching based on this. According to the above description, a structure required to construct such a system is obvious. Furthermore, the present application is not targeted towards any specific programming language. It should be understood that, the content of the present application described herein can be implemented using various programming languages, and the description given to specific languages is intended to disclose the best implementation of the present application.

A large number of specific details are explained in this description provided here. However, it can be understood that, the embodiments of the present application can be practiced without these specific details. In some examples, well-known methods, structures, and techniques are not shown in detail to avoid blurring an understanding of this description.

Similarly, it should be understood that, in order to streamline the present disclosure and assist in understanding one or more of various invention aspects, in the above description for exemplary embodiments of the present application, various features of the present application are sometimes grouped together into a single embodiment, figure, or description thereof. However, the disclosed method should not be interpreted as reflecting an intention that the present application that claimed to be protected includes more features than those explicitly stated in each claim. More precisely, as reflected in the following claims, the invention aspect lies in having fewer features than individual embodiments previously disclosed. Therefore, the claims following the specific implementation are explicitly incorporated into the specific implementation, where each claim itself serves as a separate embodiment of the present application.

Technical personnel in this field can understand that, the modules in the device in the embodiment can be adaptively changed and set in one or more devices different from the embodiment. The modules, units, or components in the embodiments can be combined into one module, unit, or component; and in addition, they can be divided into multiple sub modules, units, or components. Except for at least some of such features and/or processes or units that are mutually exclusive, any combination may be used to combine all features disclosed in this specification (including accompanying claims, abstracts, and drawings), as well as all processes or units of any method or device so disclosed. Unless otherwise explicitly stated, each feature disclosed in this specification (including accompanying claims, abstracts, and drawings) may be replaced by alternative features that provide the same, equivalent, or similar purpose.

In addition, technical personnel in this field can understand that, although some embodiments described herein include certain features included in other embodiments rather than other features, the combination of features in different embodiments means falling within a scope of the present application and forming different embodiments. For example, in the following claims, any one of the claimed embodiments can be used in any combination method.

The embodiments of various components of the present application can be implemented in hardware, or can be implemented in software modules running on one or more processors, or a combination of them. Technical personnel in this field should understand that, microprocessors or digital signal processors (DSP) can be used in practice to implement some or all functions of some or all components in a browser client device according to the embodiments of the present application. The present application may also be implemented as device or apparatus program (such as computer programs and computer program products) for executing part or all of the methods described herein. In such implementation, the program of the present application can be stored on a computer-readable medium or in the form of one or more signals. Such signals can be downloaded from internet websites, provided on carrier signals, or in any other form.

It should be noted that the above embodiments explain the present application rather than limit it, and those skilled in the art may design alternative embodiments without departing from the scope of the attached claims. In the claims, any reference symbol between parentheses should not be constructed as a limitation on the claims. A word "comprise" does not exclude the presence of components or steps not listed in the claims. The word "a" or "one" before the component does not exclude the presence of multiple such components. The present application can be implemented with the help of hardware including several different components and a computer appropriately programmed. Among unit claims that list several apparatuses, some of these apparatuses can be specifically embodied through the same hardware item. A usage of words such as first, second, and third does not indicate any order. These words can be interpreted as names.

The invention claimed is:

1. A vector shuffling method, comprising:
   receiving an instruction, the instruction comprising register identifiers and a shuffling parameter; wherein the register identifiers comprise one or more source register identifiers and a destination register identifier; the one or more source register identifiers are used to characterize one or more source registers, the one or more source registers store one or more source elements that are required when a vector shuffling operation is performed; the destination register identifier is used to characterize a destination register, and the destination register stores one or more target elements obtained after the vector shuffling operation is performed; and the shuffling parameter is used to indicate a parameter according to which the vector shuffling operation is performed on the one or more source elements;
   executing the instruction to determine, according to the shuffling parameter, position information of the one or more source elements required for the vector shuffling operation in the one or more source registers and the number of the one or more source elements required for the vector shuffling operation; wherein the shuffling parameter comprises one or more index values an index value and an opcode; the one or more index values are used to indicate position information of each of the one or more source elements required for the vector shuffling operation in the one or more source registers; and the opcode is used to characterize an operation performed on the one or more source registers and the destination register;
   when the number of the one or more index values is different from the number of the one or more source elements, determining a grouping method for the one or more source elements according to the number of the one or more index values, and determining a selection rule according to the grouping method and the opcode;
   obtaining one or more source elements indicated by each of the one or more index values respectively from the one or more source registers according to the selection rule;
   determining one or more source elements obtained according to the selection rule as the one or more target elements; and
   writing the one or more target elements into the destination register.

2. The method according to claim 1, wherein the method further comprises:
   when the number of the one or more index values is the same as the number of the one or more source elements, determining a selection rule according to the opcode.

3. The method according to claim 2, wherein the number of the one or more index values is different from the number of the one or more source elements, and the one or more source registers store at least N1 source elements, wherein N1 is a positive integer;
   the obtaining one or more source elements indicated by each of the one or more index values respectively from the one or more source registers according to the selection rule comprises:
   grouping the at least N1 source elements in the one or more source registers into one or more element groups each comprising N1 adjacent source elements; wherein data types of the N1 adjacent source elements are any one of byte, half word, or word;
   determining the N1 adjacent source elements in each of the one or more element groups as initial source elements; and
   obtaining the one or more source elements indicated by each of the one or more index values respectively from the initial source elements; and the number of the one or more source elements obtained from each of the one or more element groups is n1.

4. The method according to claim 3, wherein the N1 adjacent source elements in each of the one or more element groups are source elements with sequentially adjacent positions in the one or more source registers, and element addresses of adjacent multiple element groups are partially identical or completely different;
   wherein the data types of the N1 adjacent source elements comprised in each of the one or more element groups are the same; and data types of elements comprised in different element groups are the same or different.

5. The method according to claim 2, wherein the number of the one or more index values is the same as the number of the one or more source elements, and the one or more source registers store $M_{N2}$ source elements every N2 bits;
   the obtaining one or more source elements indicated by each of the one or more index values respectively from the one or more source registers according to the selection rule comprises:
   respectively obtaining the one or more source elements indicated by each of the one or more index values from the $M_{N2}$ source elements in every N2 bits in the one or more source registers; wherein data types of the $M_{N2}$ elements in every N2 bits are doubleword; and the number of the one or more source elements obtained from the $M_{N2}$ elements in every N2 bits is n2, and N2, $M_{N2}$ and n2 are all positive integers.

6. The method according to claim 3, wherein before the determining a grouping method for the one or more source elements according to the number of the one or more index values, the method further comprises:
creating an intermediate vector; the intermediate vector comprises one or more intermediate vector parameters, and when there are one or more element groups, the number of the one or more intermediate vector parameters is equal to the number of the one or more element groups; when there is no element group, the number of the one or more intermediate vector parameters is equal to the number of the one or more source elements required for the vector shuffling operation;
the obtaining one or more source elements indicated by each of the one or more index values respectively from the one or more source registers according to the selection rule comprises:
storing each of the one or more source elements obtained according to the selection rule respectively in a corresponding intermediate vector parameter in the intermediate vector; wherein there is a one-to-one correspondence between the one or more intermediate vector parameters and the one or more source elements obtained according to the selection rule;
the writing the one or more target elements into the destination register comprises:
writing content of each of the one or more intermediate vector parameters to a corresponding position in the destination register according to the shuffling parameter.

7. The method according to claim 2, wherein the one or more index values comprise a first index value, a second index value, a third index value, and a fourth index value; the first index value, the second index value, the third index value, and the fourth index value index different positions respectively; the one or more source registers comprise a first source register and a second source register; and the first source register stores $M_{N3}$ elements every N3 bits, and the second source register stores $M_{N3}$ elements every N3 bits;
the obtaining one or more source elements indicated by each of the one or more index values respectively from the one or more source registers according to the selection rule comprises:
respectively obtaining one or more source elements indicated by the first index value and one or more source elements indicated by the second index value from the $M_{N3}$ elements in every N3 bits in the first source register; and
respectively obtaining one or more source elements indicated by the third index value and one or more source elements indicated by the fourth index value from the $M_{N3}$ elements in every N3 bits in the second source register; wherein data types of both the $M_{N3}$ elements in every N3 bits in the first source register and the $M_{N3}$ elements in every N3 bits in the second source register are word; the number of the one or more source elements obtained from the $M_{N3}$ elements in every N3 bits in the first source register and the number of the one or more source elements obtained from the $M_{N3}$ elements in every N3 bits in the second source register are both n3, and N3, $M_{N3}$ and n3 are all positive integers;

the writing the one or more target elements into the destination register comprises:
determining the one or more source elements indicated by the first index value as one or more first target elements, and determining the one or more source elements indicated by the second index value as one or more second target elements; and
determining the one or more source elements indicated by the third index value as one or more third target elements, and determining the one or more source elements indicated by the fourth index value as one or more fourth target elements;
writing the one or more first target elements and the one or more second target elements to a first position in the destination register; and writing the one or more third target elements and the one or more fourth target elements to a second position in the destination register.

8. The method according to claim 2, wherein the one or more source registers store $M_{N4}$ elements;
the obtaining one or more source elements indicated by each of the one or more index values respectively from the one or more source registers according to the selection rule comprises:
obtaining the one or more source elements indicated by each of the one or more index values from the $M_{N4}$ elements in the one or more source registers; wherein data types of the $M_{N4}$ elements in the one or more source registers are doubleword; and the number of the one or more source elements obtained from the $M_{N4}$ elements in the one or more source registers is n4, and both $M_{N4}$ and n4 are positive integers.

9. The method according to claim 2, wherein the one or more index values comprise a first index value and a third index value, and the first index value and the third index value index different positions respectively; the one or more source registers comprise a first source register and a second source register; and the first source register stores $M_{N5}$ elements, and the second source register stores $M_{N5}$ elements;
the obtaining one or more source elements indicated by each of the one or more index values index value-respectively from the one or more source registers source register according to the selection rule comprises:
obtaining one or more first source elements indicated by the first index value from the $M_{N5}$ elements in the first source register; and obtaining one or more second source elements indicated by the third index value from the $M_{N5}$ elements in the second source register; wherein data types of both the $M_{N5}$ elements in the first source register and the $M_{N5}$ elements in the second source register are quad word; and the number of source elements obtained from the $M_{N5}$ elements in the first source register and the $M_{N5}$ elements in the second source register is n5, wherein $M_{N5}$ and n5 are positive integers;
the writing the one or more target elements into the destination register comprises:
determining the one or more first source elements as one or more target element;
determining the one or more second source elements as one or more target elements; and writing the one or more target elements determined from the one or more first source elements and the one or more target elements determined from the one or more second source elements into corresponding positions of the destination register.

10. The method according to claim 1, wherein
when the number of the one or more source registers is one, the one or more source register identifiers are different from the destination register identifier;
when the number of the one or more source registers is multiple, each of the one or more source register identifiers is different from the destination register identifier; alternatively, when the number of the one or more source registers is multiple, one of the one or more source register identifiers is the same as the destination register identifier.

11. An electronic device, comprising a memory and one or more programs, wherein the one or more programs are stored in the memory, and configured to enable one or more processors to execute the vector shuffling method according to claim 1.

12. A processor, comprising:
multiple vector registers, wherein the multiple vector registers comprise one or more source registers and a destination register, and the one or more source registers are configured to store one or more data elements;
a decoding circuit, configured to decode a vector shuffling instruction; wherein the vector shuffling instruction comprises: register identifiers and a shuffling parameter, and the register identifiers comprise one or more source register identifiers and a destination register identifier;
an executing circuit, configured to perform a vector shuffling operation on one or more source elements obtained from the one or more source registers according to the shuffling parameter in response to the vector shuffling instruction, obtain one or more target elements after performing the vector shuffling operation, and write the one or more target elements into the destination register;
wherein the executing circuit is further configured to determine, according to the shuffling parameter, position information of the one or more source elements in the one or more source registers and the number of the one or more source elements; select the one or more source elements from the one or more source registers according to the determined position information and the determined number of the one or more source elements; and determine the one or more source elements selected from the one or more source registers as the one or more target elements;
wherein the shuffling parameter comprises one or more index values and an opcode; the one or more index values are used to indicate position information of each of the one or more source elements required for the vector shuffling operation in the one or more source registers; and the opcode is used to characterize an operation performed on the one or more source registers and the destination register;
the executing circuit is configured to determine a selection rule for obtaining the one or more source elements according to the one or more index values and the opcode; and obtain one or more source elements indicated by each of the one or more index values respectively from the one or more source registers according to the selection rule;
the executing circuit is further configured to determine a grouping method for the one or more source elements in the one or more source registers according to the number of the one or more index values when the number of the one or more index values is different from the number of the one or more source elements, and determine the selection rule according to the grouping method and the opcode.

13. The processor according to claim 12, wherein,
the executing circuit is further configured to determine a selection rule according to the opcode when the number of the one or more index values is the same as the number of the one or more source elements.

14. The processor according to claim 13, wherein the number of the one or more index values is the same as the number of the one or more source elements, and the one or more source registers store $M_{N2}$ source elements every N2 bits;
the executing circuit is configured to respectively obtain the one or more source elements indicated by each of the one or more index values from the $M_{N2}$ source elements in every N2 bits in the one or more source registers; wherein data types of the $M_{N2}$ elements in every N2 bits are doubleword; and the number of the one or more source elements obtained from the $M_{N2}$ elements in every N2 bits is n2, and N2, $M_{N2}$ and n2 are all positive integers.

15. The processor according to claim 13, wherein the one or more index values comprise a first index value, a second index value, a third index value, and a fourth index value, and the first index value, the second index value, the third index value, and the fourth index value index different positions respectively; the one or more source registers comprise a first source register and a second source register; and the first source register stores $M_{N3}$ elements every N3 bits, and the second source register stores $M_{N3}$ elements every N3 bits;
the executing circuit is configured to respectively obtain one or more source elements indicated by the first index value and one or more source elements indicated by the second index value from the $M_{N3}$ elements in every N3 bits in the source register; and respectively obtain one or more source elements indicated by the third index value and one or more source elements indicated by the fourth index value from the $M_{N3}$ elements in every N3 bits in the second source register; wherein data types of both the $M_{N3}$ elements in every N3 bits in the first source register and the $M_{N3}$ elements in every N3 bits in the second source register are word; the number of the one or more source elements obtained from the $M_{N3}$ elements in every N3 bits in the first source register and the number of the one or more source elements obtained from the $M_{N3}$ elements in every N3 bits in the second source register are both n3, and N3, $M_{N3}$, and n3 are all positive integers; determine the one or more source elements indicated by the first index value as one or more first target elements, determine the one or more source elements indicated by the second index value as one or more second target elements; determine the one or more source elements indicated by the third index value as one or more third target elements, and determine the one or more source elements indicated by the fourth index value as one or more fourth target elements; write the one or more first target elements and the one or more second target elements to a first position in the destination register; and write the one or more third target elements and the one or more fourth target elements to a second position in the destination register.

16. The processor according to claim 13, wherein the one or more source registers store $M_{N4}$ elements;
the executing circuit is configured to obtain the one or more source elements indicated by each of the one or more index values from the $M_{N4}$ elements in the one or more source registers; wherein data types of the $M_{N4}$ elements in the one or more source registers are double-word; and the number of the one or more source elements obtained from the $M_{N4}$ elements in the one or more source registers is n4, and both $M_{N4}$ and n4 are positive integers.

17. The processor according to claim 13, wherein the one or more index values comprise a first index value and a third index value, wherein the first index value and the third index value index different positions respectively; and the one or more source registers comprise a first source register and a second source register; and the first source register stores $M_{N5}$ elements, and the second source register stores $M_{N5}$ elements;

the executing circuit is configured to obtain one or more first source elements indicated by the first index value from the $M_{N5}$ elements in the first source register; and obtain one or more second source elements indicated by the third index value from the $M_{N5}$ elements in the second source register; wherein data types of both the $M_{N5}$ elements in the first source register and the $M_{N5}$ elements in the second source register are quad word; and the number of source elements obtained from the $M_{N5}$ elements in the first source register and the $M_{N5}$ elements in the second source register is n5, wherein $M_{N5}$ and n5 are positive integers; determine the one or more first source elements as one or more target element; determining the one or more second source elements as one or more target elements; and writing the one or more target elements determined from the one or more first source elements and the one or more target elements determined from the one or more second source elements into corresponding positions of the destination register.

18. The processor according to claim 12, wherein the number of the one or more index values is different from the number of the one or more source elements, and the one or more source registers store at least N1 source elements, wherein N1 is a positive integer;

the executing circuit is configured to group the at least N1 source elements in the one or more source registers into one or more element groups each comprising N1 adjacent source elements; wherein data types of the N1 adjacent source elements are any one of byte, half word, or word; determine the N1 adjacent source elements in each of the one or more element groups as initial source elements; and obtain the one or more source elements indicated by each of the one or more index values respectively from the initial source elements; wherein the number of the one or more source elements obtained from each of the one or more element groups is n1.

19. The processor according to claim 18, wherein the N1 adjacent source elements in each of the one or more element groups are source elements with sequentially adjacent positions in the one or more source registers, and element addresses of adjacent multiple element groups are partially identical or completely different;

wherein the data types of the N1 adjacent source elements comprised in each of the one or more element groups are the same; and data types of elements comprised in different element groups are the same or different.

20. The processor according to claim 18, wherein, the executing circuit is configured to create an intermediate vector; the intermediate vector comprises one or more intermediate vector parameters, and when there are one or more element groups, the number of the one or more intermediate vector parameters is equal to the number of the one or more element groups; when there is no element group, the number of the one or more intermediate vector parameters is equal to the number of the one or more source elements required for the vector shuffling operation; store each of the one or more source elements obtained according to the selection rule respectively in a corresponding intermediate vector parameter in the intermediate vector; wherein there is a one-to-one correspondence between the one or more intermediate vector parameters and the one or more source elements obtained according to the selection rule; and write content of each of the one or more intermediate vector parameters to a corresponding position in the destination register according to the shuffling parameter.

* * * * *